United States Patent
Ohta

(10) Patent No.: US 8,780,052 B2
(45) Date of Patent: Jul. 15, 2014

(54) INPUT DATA PROCESSING PROGRAM AND INFORMATION PROCESSING APPARATUS

(75) Inventor: Keizo Ohta, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 2337 days.

(21) Appl. No.: 11/495,595

(22) Filed: Jul. 31, 2006

(65) Prior Publication Data

US 2007/0046647 A1 Mar. 1, 2007

(30) Foreign Application Priority Data

Aug. 30, 2005 (JP) ................................. 2005-249264

(51) Int. Cl.
- *G09G 5/00* (2006.01)
- *G06F 3/0488* (2013.01)
- *A63F 13/06* (2006.01)

(52) U.S. Cl.
CPC ....... *G06F 3/0488* (2013.01); *A63F 2300/6045* (2013.01); *G06F 3/04883* (2013.01); *A63F 13/06* (2013.01); *G06F 3/04886* (2013.01); *A63F 2300/1068* (2013.01)
USPC ......................................................... 345/173

(58) Field of Classification Search
USPC ........................... 345/173, 156–157, 159–160
See application file for complete search history.

(56) References Cited

U.S. PATENT DOCUMENTS

| | | | |
|---|---|---|---|
| 5,666,113 A | | 9/1997 | Logan |
| 5,808,601 A | * | 9/1998 | Leah et al. .................... 715/856 |
| 6,292,173 B1 | | 9/2001 | Rambaldi et al. |
| 2003/0234768 A1 | * | 12/2003 | Rekimoto et al. ............ 345/169 |
| 2004/0136564 A1 | * | 7/2004 | Roeber et al. ................. 382/100 |
| 2004/0160419 A1 | * | 8/2004 | Padgitt .......................... 345/173 |
| 2005/0110768 A1 | | 5/2005 | Marriott et al. |
| 2006/0161846 A1 | * | 7/2006 | Van Leeuwen ............... 715/702 |
| 2006/0181519 A1 | * | 8/2006 | Vernier et al. ................ 345/173 |
| 2007/0174788 A1 | * | 7/2007 | Ording ......................... 715/816 |

FOREIGN PATENT DOCUMENTS

| | | |
|---|---|---|
| JP | 09-204262 | 8/1997 |
| JP | 2003-5913 | 1/2003 |

OTHER PUBLICATIONS

Office Action dated May 24, 2010 issued in corresponding Japanese Application No. JP 2005-249264.
Extended European Search Report (7 pgs.) dated Mar. 5, 2012 issued in corresponding European Application No. 06016010.8-1265.

* cited by examiner

*Primary Examiner* — William Boddie
*Assistant Examiner* — Leonid Shapiro
(74) *Attorney, Agent, or Firm* — Nixon & Vanderhye P.C.

(57) ABSTRACT

The game apparatus executes a storage step of repeatedly acquiring input area data representing an input area 41 in accordance with a detection result from the input device, and storing the input area data in a memory. Next, the game apparatus executes: a virtual area determination step of determining a virtual area 42 so as to follow a change of the input area 41 represented by the input area data each time the input area data is stored in the memory; and a first process execution step of executing a first process, such as a process of moving a cursor, in accordance with the virtual area 42 having been determined by the virtual area determination step.

18 Claims, 14 Drawing Sheets

INPUT DATA PROCESSING PROGRAM AND INFORMATION PROCESSING APPARATUS

CROSS REFERENCE OF RELATED APPLICATION

The disclosure of Japanese Patent Application No. 2005-249264 is incorporated herein by reference.

BACKGROUND

1. Field of the Invention

Present example embodiments of the technology described herein relate to an input data processing program and an information processing apparatus for processing data inputted from an input device such as a touch pad.

2. Description of the Background Art

Conventionally, known is a technology for allowing an operator to touch-operate a pointing device such as a touch panel with a finger and the like so as to control an object (for example, a cursor) and the like displayed on a screen. Here, an input position on an input surface may be determined based on an area on which the finger touches the input surface. For example, in FIG. 18, an operator touches an input surface 91 on a circular area 92 with a finger. At this time, the input position is determined as a position 93 representing the center of the circular area 92. That is, it is determined that the operator is designating the position 93 representing the center of the circular area 92. As a method for determining the input position based on the touch area, a method for determining the centroid of the touch area as the input position, can be used.

However, an area on which the operator touches the input surface with the finger may be variable. Therefore, in the aforementioned method for determining the input position based on the touch area, the input position may move against the operator's intention, resulting in an operation unintended by the operator being performed. Particularly, when the operator starts to touch the input surface with a finger or when the operator stops touching the input surface (when the operator removes the finger from the input surface), a position and a size of the finger touch area may substantially change. Therefore, especially at the touch start point or at the touch stop point, the operation unintended by the operator is likely to be performed.

FIG. 19 is a diagram illustrating a state of an input surface in which an operator is removing a finger from the input surface in the state shown in FIG. 18. That is, at the time shown in FIG. 19, the operator is touching the input surface 91 on a circular area 94 with the finger. At this time, the input position is determined as a position 95 representing the center of the circular area 94. Accordingly, when the state shown in FIG. 18 changes to the state shown in FIG. 19, it is determined that the input position moves from the position 93 to the position 95. However, in this case, the operator simply desires to remove the finger from the input surface with no intention to move the input position. That is, in this case, an operation unintended (or undesired) by the operator, such as moving a cursor on a screen, is performed due to the input position being moved. Therefore, the operator feels that the controllability of a pointing device is unsatisfactory. Further, not only when the operator removes the finger from the input surface but also when the operator attempts to touch the input surface with the finger or to move the finger on the input surface, the change of the touch area may cause the operation unintended by the operator.

A touch operation position detection apparatus disclosed in Japanese Laid-Open Patent Publication No. 2003-5913 (hereinafter, referred to as Patent Document 1) has light emitting elements and light receiving elements disposed around a touch panel, and a camera positioned lateral to the light receiving elements. The touch operation position detection apparatus calculates, based on information from the light receiving elements, the center position of an area on which the operator touches with a finger, and corrects the center position based on photograph information from the camera. Thus, the touch operation position detection apparatus is directed to accurately calculate an input position as intended by the operator.

In the touch operation position detection apparatus disclosed in Patent Document 1, it is necessary to dispose the light emitting elements and the light receiving elements around the touch panel, and further provide the camera. Therefore, the technology disclosed in Patent Document 1 causes an increase in cost and size of the apparatus, and requires the apparatus of complicated structure. Further, reduction in the numbers of the light emitting elements and the light receiving elements causes a deterioration of a detection accuracy, whereby it is impossible to accurately correct the center position at any time. When the center position cannot be accurately corrected, the operation unintended by the operator will be performed as described above, thereby deteriorating controllability of the pointing device.

SUMMARY

Therefore, one aspect of the present example embodiments is to provide an input data processing program and an information processing apparatus capable of improving controllability of a pointing device with a simple structure.

The present example embodiments have the following features to attain the aspect mentioned above. The reference numerals, supplementary description and the like in the parentheses are provided to indicate the correspondence with the present example embodiments described later in order to aid in understanding the present example embodiments and are not intended to limit, in any way, the scope of the present invention.

A first aspect is directed to a computer-readable storage medium having stored thereon an input data processing program (game program) which causes a computer (CPU 11 and the like), of an information processing apparatus (game apparatus 2) including an input device (touch pad 7) for detecting for an input area on which an input to an input surface is being made, to execute the following steps. The input data processing program causes the computer to execute: a storage step (S13); a virtual area determination step (S21, S28); and a first process execution step (S3). The storage step repeatedly acquires input area data (51, 52) representing the input area (41) in accordance with a detection result from the input device, and stores the input area data in a memory (main memory 17) of the information processing apparatus. The virtual area determination step determines a virtual area (42) so as to follow a change of the input area represented by the input area data each time the input area data is stored in the memory. The first process execution step executes a first process (a process of moving a cursor) in accordance with the virtual area having been determined by the virtual area determination step.

In a second aspect, one of a center position of the virtual area and a centroid of the virtual area may be calculated as a position of the virtual area, thereby executing the first process in accordance with the position of the virtual area.

In a third aspect, the virtual area determination step may determine a position of the virtual area such that a smaller one of the input area and the virtual area is within a larger one of said areas.

In a fourth aspect, the virtual area determination step may include a size determination step (S14) and a moving step (S28). The size determination step determines a size of the virtual area so as to follow a size of the input area each time the input area data is stored in the memory. The movement step moves, when at least a portion of the smaller one of the virtual area having the size determined by the size determination step and the input area is outside the larger one, the position of the virtual area such that the smaller one is entirely within the larger one.

In a fifth aspect, the size determination step may determine the size of the virtual area using a difference between the size of the virtual area having been most recently determined and the size of the input area.

In a sixth aspect, each of the input area and the virtual area may be represented as a circular area. At this time, the size determination step determines a radius of the virtual area using a difference between the radius of the virtual area having been most recently determined and a radius of the input area.

In a seventh aspect, the movement step may determine, when the smaller one of the virtual area and the input area has an external area which is outside the larger one, a moving distance over which the virtual area is moved, in accordance with a size of the external area.

In an eighth aspect, each of the input area and the virtual area may be represented as a circular area. At this time, the movement step determines a moving distance over which the virtual area is moved, by using a radius of the input area, a radius of the virtual area, and a distance between a center position of the virtual area having been most recently calculated and a center position of the input area.

In a ninth aspect, the virtual area may be represented as a circular area. That is, the virtual area determination step stores, in the memory, virtual position data representing a position of the virtual area and virtual radius data representing a radius of the virtual area. The first process execution step determines, using at least one of the virtual position data and the virtual radius data stored in the memory, a content of the first process to be executed.

In a tenth aspect, the input device may output data representing an area size of the input area and a position of the input area. At this time, the storage step includes an acquisition step and an area calculation step. In the acquisition step, the computer acquires the data outputted by the input device. The area calculation step calculates a circular area having, at a center thereof, the position represented by the data having been acquired and having the area size represented by the data having been acquired, and stores, as the input area data, data representing the circular area having been calculated.

In an eleventh aspect, the storage step may stop, when the detection result from the input device indicates that no input is made to the input surface, storing the input area data in the memory.

In a twelfth aspect, the information processing apparatus includes a display device (television set 6). Further, the first process execution step may execute, as the first process, a process of moving, using a position of the virtual area, a position of an object (cursor 33) displayed on a screen of the display device.

In a thirteenth aspect, the input device may include a pressing-operation detection device (switch), supporting the input surface so as to allow the input surface to be pressed, for detecting that the input surface has been pressed. At this time, the input data processing program may cause the computer to further execute a second process execution step of executing, when the input surface having been pressed is detected, a second process (character input process).

In a fourteenth aspect, the information processing apparatus includes a display device. Further, the first process execution step may execute, as the first process, a process of moving a position of a cursor displayed on a screen of the display device, in accordance with a position of the virtual area. At this time, the second process execution step executes the second process using, as a subject to be processed, an object designated by the cursor from among objects (each key of a keyboard 32) displayed on the screen.

A fifteenth aspect is directed to a computer readable storage medium having stored thereon an input data processing program (game program) which causes a computer of an information processing apparatus (game apparatus 2) to execute the following steps, and the information processing apparatus includes a display device (television set 6), a first input device (touch pad 7, stick key, or the like) for detecting for an operation state of a player operating an operation section (an input surface of the touch pad 7, a stick of the stick key, or the like), and outputting a two-dimensional value representing the operation state, and a second input device (switch) for detecting that the operation section has been pressed. The input data processing program causes the computer to execute: a display control step (S6); a storage step (S51); an acquisition step (S4); a position control step (S52, S3); a previous position identification step (S53); and a process execution step (S54). In the display control step, the computer displays, on a screen of the display device, a plurality of objects (keys shown in FIG. 3) and a cursor (33) for designating one of the plurality of objects. The storage step repeatedly acquires, from the first input device, first data (input coordinate data 51) representing the two-dimensional value, and stores the first data in a memory (main memory 17) of the information processing apparatus. The acquisition step acquires, from the second input device, second data indicating that the operation section has been pressed. The position control step determines a position of the cursor using the two-dimensional value represented by the first data each time the first data is stored in the memory. The previous position identification step identifies, when the second data has been acquired, the position of the cursor using the first data which precedes, by a predetermined number of pieces of the first data, the first data which is stored in the memory immediately after the second data has been acquired. The process execution step subjects, to a process corresponding to an operation of the operation section being pressed, the object to have been designated by the cursor which was at the position identified by the previous position identification step, when the second data has been acquired.

In a sixteenth aspect, the predetermined number used by the previous position identification step may be pre-set.

In a seventeenth aspect, the first input device may be capable of detecting for an area size of an input area on which an input to an input surface is being made. At this time, the first data represents the area size of the input area and the two-dimensional value. The previous position identification step identifies, when a difference between the area size of the input area represented by the first data stored at a certain time and the area size of the input area represented by the first data immediately following the first data stored at the certain time has a value greater than a predetermined value, the position of the cursor by using one of the two-dimensional value represented by the first data stored at the certain time and the two-dimensional value represented by the first data immediately following the first data stored at the certain time.

An eighteenth aspect is directed to an information processing apparatus (game apparatus 2) including an input device (touch pad 7) for detecting for an input area on which an input to an input surface is being made. The information processing apparatus comprises: a storage control means (CPU 11 for executing S13, and the like. Hereinafter, only step Nos. are described); a virtual area determination means (S21, S28); and a first process execution means (S3). The storage control means repeatedly acquires input area data representing the input area in accordance with a detection result from the input device, and stores the input area data in a memory of the information processing apparatus. The virtual area determination means determines a virtual area so as to follow a change of the input area represented by the input area data each time the input area data is stored in the memory. The first process execution means executes a first process in accordance with the virtual area having been determined by the virtual area determination means.

A nineteenth aspect is directed to an information processing apparatus (game apparatus 2) including a display device (television set 6), a first input device (touch pad 7, stick key, or the like) for detecting for an operation state of a player operating an operation section (an input surface of the touch pad 7, a stick of the stick key, or the like), and outputting a two-dimensional value representing the operation state, and a second input device (switch) for detecting that the operation section has been pressed. The information processing apparatus comprises: a display control means (S6); a storage control means (S51); an acquisition means (S4); a position control means (S52, S3); a previous position identification means (S53); and a process execution means (S54). The display control means displays, on a screen of the display device, a plurality of objects and a cursor for designating one of the plurality of objects. The storage control means repeatedly acquires, from the first input device, first data representing the two-dimensional value, and stores the first data in a memory of the information processing apparatus. The acquisition means acquires, from the second input device, second data indicating that the operation section has been pressed. The position control means determines a position of the cursor using the two-dimensional value represented by the first data each time the first data is stored in the memory. The previous position identification means identifies, when the second data has been acquired, the position of the cursor using the first data which precedes, by a predetermined number of pieces of the first data, the first data which is stored in the memory immediately after the second data has been acquired. The process execution means subjects, to a process corresponding to an operation of the operation section being pressed, the object to have been designated by the cursor which was at the position identified by the previous position identification means, when the second data has been acquired.

A twentieth aspect is directed to an input device (controller 5) which can be connected to an information processing apparatus for executing a predetermined data process in accordance with operation data. The input device comprises: a storage control means; a virtual area determination means; and a transmission means. The storage control means repeatedly detects for an input area on which an input to an input surface is being made, and stores, in a memory, input area data representing the input area. The virtual area determination means determines a virtual area so as to follow a change of the input area represented by the input area data each time the input area data is stored in the memory. The transmission means transmits data representing the virtual area having been determined by the virtual area determination means, as the operation data, to the information processing apparatus.

According to the first aspect, a content of the first process to be performed in accordance with an operator's manipulation is determined in accordance with the virtual area which changes so as to follow the input area. That is, the first process is performed in accordance with the virtual area which more slowly changes than the input area representing an actual touch area. Accordingly, when the touch area on which the operator touches the input surface with a finger is changed, the change can be alleviated or prevented by using the virtual area, thereby preventing the change of the touch area from exerting an influence on the first process. Therefore, it is possible to prevent an operation unintended by the operator from being performed due to the change of the touch area on which the operator touches the input surface with the finger. Further, according to the first aspect, components such as a camera and the like are unnecessary, and therefore controllability of a pointing device can be improved with a simplified structure.

According to the second aspect, the center position or the centroid of the virtual area is determined as the position of the virtual area, whereby it is possible to easily calculate the position of the virtual area.

According to the third aspect, the position of the virtual area is determined such that the smaller one of the input area or the virtual area is always within the larger one of the areas. Accordingly, the position of the virtual area can be determined so as to accurately follow the position of the input area.

According to the fourth aspect, only when at least a portion of the smaller one of the virtual area or the input area is outside the larger one, the virtual area is moved. That is, when the smaller one is within the larger one, the virtual area is not moved. Therefore, when the position and the size of the input area slightly change, the virtual area is not always moved. Therefore, the virtual area more slowly moves than the input area, thereby ensuring that an operation unintended by the operator can be prevented.

According to the fifth aspect, the size of the virtual area to be changed is determined using the difference between the size of the input area and the size of the virtual area having been most recently determined. Thus, the size of the virtual area can be easily determined so as to follow the size of the input area.

According to the sixth aspect, each of the input area and the virtual area is represented as a circular area, whereby it is possible to represent each area using its center position and radius. Therefore, the size (radius) of the virtual area to be changed can be calculated using the difference between the radius of the input area and the radius of the virtual area having been most recently determined, whereby it is possible to easily calculate the size of the virtual area to be changed.

According to the seventh aspect, the moving distance over which the virtual area is to be moved is determined in accordance with the size of the external area. The external area represents a portion of the smaller one of the virtual area or the input area, which is outside the larger one. That is, the moving distance is determined in accordance with the size of the portion of the smaller one which is outside the larger one, thereby accurately calculating the moving distance.

According to the eighth aspect, each of the input area and the virtual area is represented as a circular area, whereby it is possible to represent each area using its center position and the radius. Therefore, the moving distance can be easily calculated using the radius of the input area, the radius of the virtual area, and the distance between the center position of the virtual area having been most recently determined and the center position of the input area.

According to the ninth aspect, the virtual area is determined as a circular area, whereby it is possible to represent the position and the shape (size) of the virtual area using the coordinates of the center position and the length of the radius thereof. Accordingly, the virtual area can be represented with a reduced amount of data.

According to the tenth aspect, the input area is determined as a circular area, whereby it is possible to represent the input area with a reduced amount of data as in the case of the virtual area determined as a circular area.

According to the eleventh aspect, when no input is made to the input surface, a process of storing the input area data is not performed. Therefore, a process of determining the virtual area is not performed. When no input is made to the input surface, it is unnecessary to determine the virtual area. According to the seventh aspect, the virtual area determination process, which is unnecessary when no input is made to the input surface, can be eliminated.

According to the twelfth aspect, an object, such as a cursor, to be displayed on the screen of the display device is moved in accordance with the position of the virtual area, that is, in accordance with the operator operating the input device. Accordingly, when the operator is performing the operation of moving the object, it is possible to prevent a movement of the object unintended by the operator.

According to the thirteenth aspect, the operator can perform an operation of pressing the input surface in addition to the operation of designating an arbitrary position on the input surface. In this case, the input area size may be substantially changed by pressing the input surface. Therefore, if the first process is performed using the input area, an operation unintended by the operator may be performed when an operation of pressing the input surface is performed. On the other hand, according to the thirteenth aspect, even when the input surface is pressed, the operation unintended by the operator can be prevented.

According to the fourteenth aspect, a cursor to be displayed on a screen of the display device is moved in accordance with the position of the virtual area, that is, in accordance with the operator operating the input device. An object designated by the cursor is subjected to the second process. When performed is an operation of designating the object using the cursor so as to subject the object to the second process, the object may be moved against the operator's intention. Also in this case, it is possible to prevent the object unintended by the operator from being subjected to the second process.

According to the fifteenth aspect, the operator can operate the operation section (for example, the operator touches the input surface of the touch pad, or the operator tilts a stick key), so as to move the cursor. Further, the operator can press the operation section (for example, the operator presses the input surface of the touch pad or the stick key), so as to subject, to a predetermined process, the object designated by the cursor. When the operation section is pressed so as to execute the predetermined process, a state of the operation section being operated may be changed against the operator's intention. That is, the input area size on the touch pad may be increased or the stick key may be tilted against the operator's intention.

According to the fifteenth aspect, when it is detected that the operation section has been pressed, the position of the cursor is identified using the first data which precedes, by a predetermined number of pieces of the first data, the first data obtained when the operation section having been pressed is detected. That is, identified is the position of the cursor obtained slightly before the operation section having been pressed is detected, that is, before the state of the operation section being operated is changed. The position of the cursor having been identified is determined as a position of the cursor obtained when the operation section is pressed, so as to execute the predetermined process. Thus, based on the position of the cursor obtained before the state of the operation section being operated is changed, that is, the position of the cursor intended by the operator, the predetermined process is executed. According to the fifteenth aspect, it is possible to prevent an operation unintended by the operator from being performed when the operation section is pressed.

According to the sixteenth aspect, the predetermined number is pre-set. Therefore, when the operation section having been pressed is detected, the game apparatus can easily determine the first data to be used.

According to the seventeenth aspect, the first data obtained when the input area size substantially changes is used, so as to determine the position of the cursor. That is, time at which the state of the operation section being operated is changed is detected, and the position of the cursor is determined using the first data obtained at this time. Thus, based on the change of the input area size, time at which the state of the operation section being operated can be accurately detected, thereby ensuring that the operation unintended by the operator can be prevented when the operation section is pressed.

According to the eighteenth aspect and the twentieth aspect, the same effect as that of the first aspect can be obtained. Further, according to the nineteenth aspect, the same effect as that of the fifteenth aspect can be obtained.

These and other features, aspects and advantages of the present example embodiments will become more apparent from the following detailed description of the present example embodiments when taken in conjunction with the accompanying drawings.

DESCRIPTION OF THE NON-LIMITING, EXAMPLE EMBODIMENTS

First Embodiment

Figure 1:
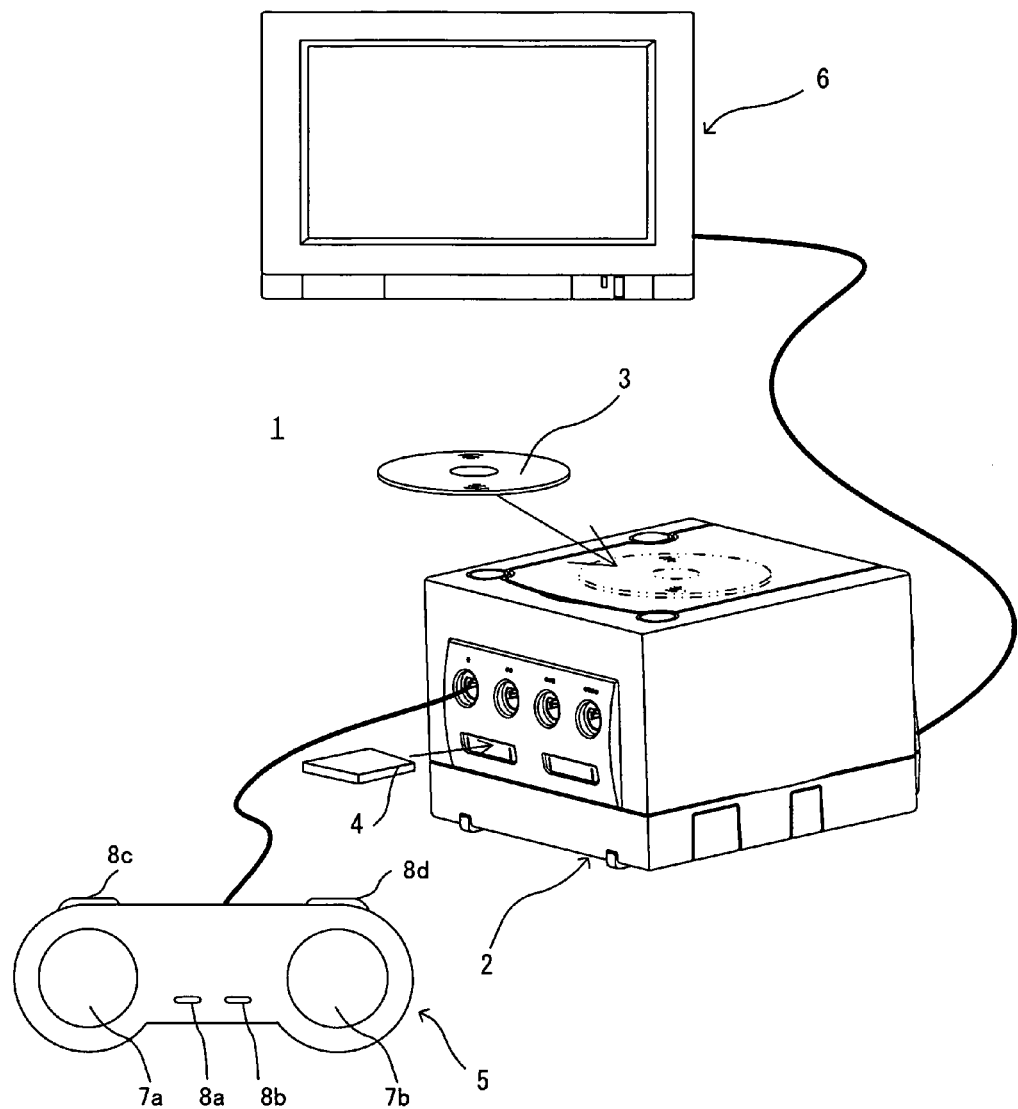
FIG. 1 is an external view illustrating a structure of a game system typifying an information processing apparatus according to a first embodiment.
Figure 2:
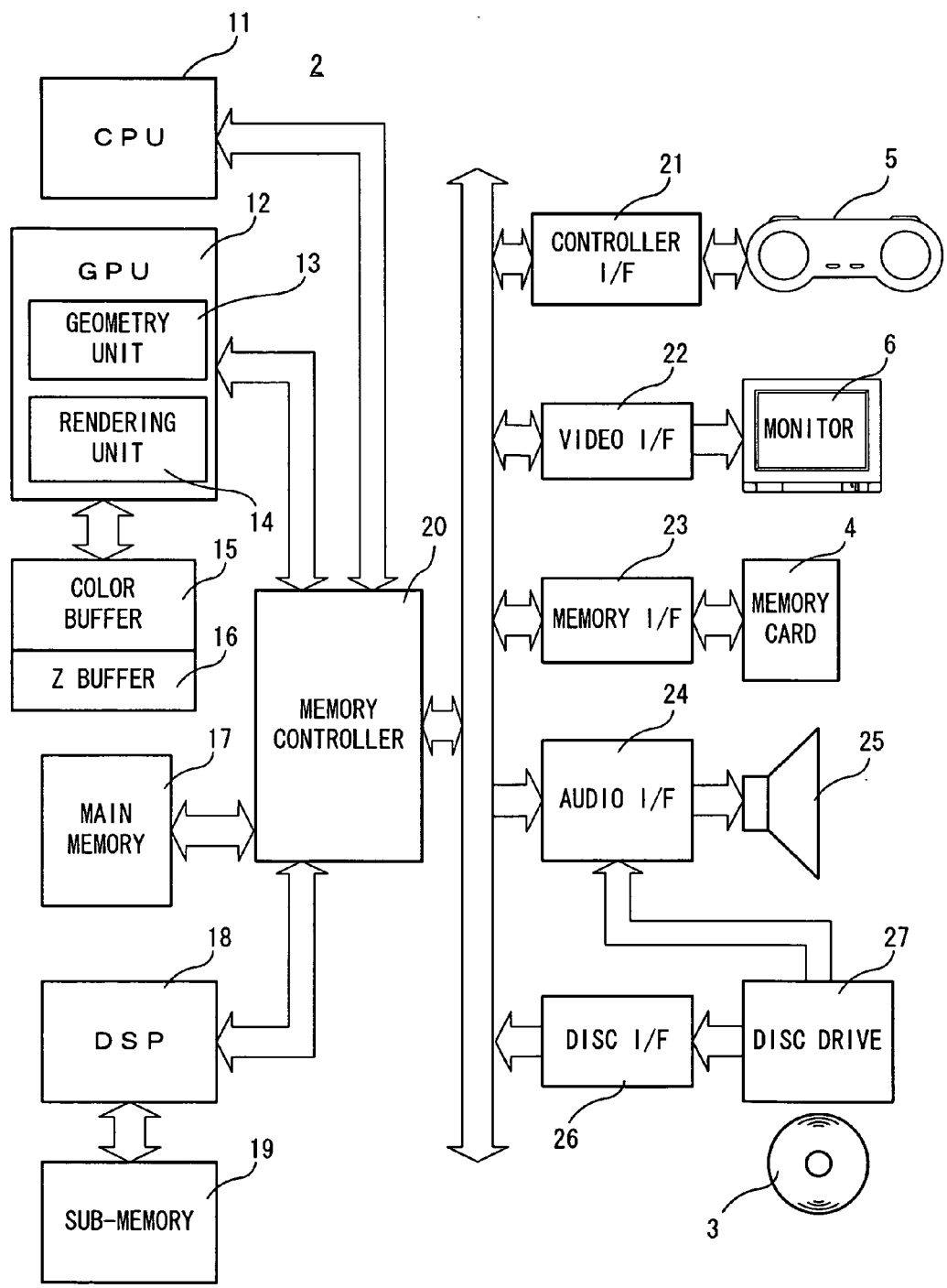
FIG. 2 is a block diagram of the game system shown in FIG. 1.

FIG. 1 is an external view illustrating a structure of a game system typifying an information processing apparatus according to a first embodiment of the present example embodiment, and FIG. 2 is a block diagram of the game system shown in FIG. 1. As shown in FIGS. 1 and 2, the game system 1 includes a game apparatus 2, an optical disc 3, a memory card 4, a controller 5, and a television set 6 having a speaker 25 shown in FIG. 2. The optical disc 3 and the memory card 4 are detachably mounted on the game apparatus 2. The controller 5 is connected to one of a plurality (for example, four as shown in FIG. 1) of controller port connectors of the game apparatus 2. The controller 5 has a plurality of operation sections such as a first touch pad 7a, a second touch pad 7b, a start button 8a, a select button 8b, an L button 8c and an R button 8d. According to another embodiment, the controller 5 may wirelessly communicate with the game apparatus 2, that is, no communication cable is used in this case. The television set 6 and the speaker 25 are connected to the game apparatus 2 via an AV cable and the like. While FIG. 1 shows that a stationary game apparatus is used, a hand-held game apparatus, an arcade game apparatus, an apparatus such as a mobile telephone or a personal computer capable of executing a program, can be also used for the present example embodiment. Hereinafter, with reference to FIG. 2, respective components and a typical operation of the game system according to the present example embodiment will be described in detail.

The optical disc 3 such as a DVD-ROM is used as an example of an external storage medium. The optical disc 3 fixedly stores a game program typifying the program according to the present example embodiment, and data, such as character data, relating to a game. When a player plays the game, the optical disc 3 is mounted on the game apparatus 2. A means for storing the game program and the like is not restricted to a DVD-ROM. The means for storing the game program and the like may be a storage medium such as a CD-ROM, an MO, a memory card, or a ROM cartridge. Alternatively, a game program downloaded through communication may be stored in a storage means such as a memory or a hard disk incorporated in the game apparatus. The memory card 4 is, for example, a rewritable storage medium such as a flash memory. The memory card 4 stores data such as saved data for a game.

The game apparatus 2 reads the game program stored in the optical disc 3 so as to perform a game process. The controller 5 is an input device used for a player to make an input for game play. The controller 5 outputs operation data to the game apparatus 2 in accordance with a player operating the touch pads 7a and 7b and pressing the operation buttons 8a, 8b, 8c, and 8d, and switches described below (not shown). When two or more players play the game, the number of the controllers 5 provided is the same as the number of the players. The television set 6 displays, on a screen, image data outputted by the game apparatus 2. The speaker 25, which is typically incorporated in the television set 6, outputs sound for a game outputted by the game apparatus 2.

As described above, the controller 5 has two touch pads, i.e., the touch pad 7a and the touch pad 7b, which are provided on the right side and the left side of the main surface thereof, respectively. The touch pads 7a and 7b have the same structure. In the following description, when it is unnecessary to discriminate between the touch pad 7a and the touch pad 7b, each of the touch pad 7a and the touch pad 7b is simply referred to as "touch pad 7". The touch pad 7 may be of any one of a resistive film type, an optical (infrared) type, a capacitive coupling type or the like.

In the first embodiment, the touch pad 7 detects for an area size of an area (input area) on which a player touches an input surface with a finger and the like, and a position of the input area, and outputs the detection result. The touch pad 7 detects for the centroid (or the center position) of the input area as the position of the input area. As the touch pad 7, any device capable of detecting for the position and a shape (size) of the input area can be used. For example, the device capable of detecting for all positions at which the player is touching the input surface with the finger and the like may be used. In this case, a collection of the positions having been detected is used as the input area.

The touch pad 7 detects for an area size (input area size) of the input area and the position (input position) of the input area at intervals of a predetermined sampling time, and outputs input data representing the input area size and the input position having been detected. The input data is outputted as operation data from the controller 5 to the game apparatus 2. Although in the present embodiment the intervals of the predetermined sampling time correspond to time intervals at which a frame is updated, the intervals of the predetermined sampling time may be other than the time intervals at which a frame is updated.

Further, in the first embodiment, a housing of the controller 5 supports the input surface of the touch pad 7 using a spring and the like so as to allow the input surface of the touch pad 7 to be pressed. A switch (not shown) is provided on the reverse side of each of the touch pads 7a and 7b. The player presses the input surface of the touch pad 7 so as to press the switch. That is, the switch is used for detecting whether or not the input surface of the touch pad 7 has been pressed. Data indicating whether or not the switch has been pressed is outputted as operation data from the controller 5 to the game apparatus 2, as in the case of the input data from the touch pad 7.

The aforementioned controller 5 is an example of the input device for use in the first embodiment. As the input device, any pointing device capable of detecting for the input area on the input surface, can be used. For example, the input device may have a single touch pad, or the input device may include a touch panel instead of the touch pad.

Next, a structure of the game apparatus 2 will be described. As shown in FIG. 2, the game apparatus 2 includes a CPU 11 and a memory controller 20 connected to the CPU 11. Further, in the game apparatus 2, the memory controller 20 is connected to a graphics processing unit (GPU) 24, a main memory 17, a digital signal processing circuit (DSP) 36, and various interfaces (I/Fs) 21 to 26. Via the DSP 18, the memory controller 20 is connected to a sub-memory 19. The memory controller 20 controls data transfer among the respective components.

At the start of a game, a disc drive 27 initially drives the optical disc 3 mounted on the game apparatus 2. The game program stored on the optical disc 3 is loaded to the main memory 17 via a disc I/F 26 and the memory controller 20. When the CPU 11 executes the program on the main memory 17, the game is started. After the game is started, a player makes an input to the controller 5 for game play and the like using the touch pads 7a and 7b, the respective operation buttons 8a, 8b, 8c, and 8d, and the aforementioned switches. In accordance with the input having been made by the player, the controller 5 outputs operation data to the game apparatus 2. The operation data outputted by the controller 5 is inputted to the CPU 11 via a controller I/F 21 and the memory controller 20. The CPU 11 is operable to perform a game process in accordance with the operation data having been inputted thereto. When generating image data and the like during the game process, the GPU 12 and the DSP 18 are used. Further, the sub-memory 19 is used when the DSP 18 performs a predetermined process.

The GPU 12 includes a geometry unit 13 and a rendering unit 14, and is connected to a memory dedicated to image processing. The memory dedicated to image processing is used as, for example, a color buffer 15 and a Z buffer 16. The geometry unit 13 performs calculation for coordinates of a solid model of an object and a graphic in a game space representing a virtual three-dimensional space (for example, a solid model of an object of a polygon). For example, the geometry unit 13 rotates, enlarges, downsizes, and transforms the solid model, and further converts coordinates in a world coordinate system into coordinates in a viewpoint coordinate system or into coordinates in a screen coordinate system. The rendering unit 14 writes, for each pixel, color data (RGB data) of the solid model projected on the screen coordinate system into the color buffer 15 based on a predetermined texture, thereby generating a game image. Further, the color buffer 15 is a memory area allocated so as to store game image data (RGB data) generated by the rendering unit 14. The Z buffer 16 is a memory area allocated so as to store, when the three-dimensional viewpoint coordinates are converted into two-dimensional screen coordinates, information of the depth dimension as seen from the viewpoint. The GPU 12 generates image data to be displayed on the television set 6 using the geometry unit 13, the rendering unit 14, the color buffer 15, and the Z buffer 16, and outputs the generated image data to the television set 6 via the memory controller 20 and a video I/F 22 as necessary. Sound data generated by the CPU 11 at the execution of the game program is outputted from the memory controller 20 to the speaker 25 via an audio I/F 24. Although the first embodiment is configured as hardware in which the memory dedicated to image processing is provided, a UMA (Unified Memory Architecture) may be adopted in which a portion of the main memory 17 is used as a memory for image processing, for example. The game apparatus 2 transfers game data generated by executing the game program to the memory card 4 via the memory controller 20 and a memory I/F 23. Further, the game apparatus 2 loads game data stored in the memory card 4 into the main memory 17 via the memory controller 20 and the memory I/F 23 before the game is started.

Figure 3:
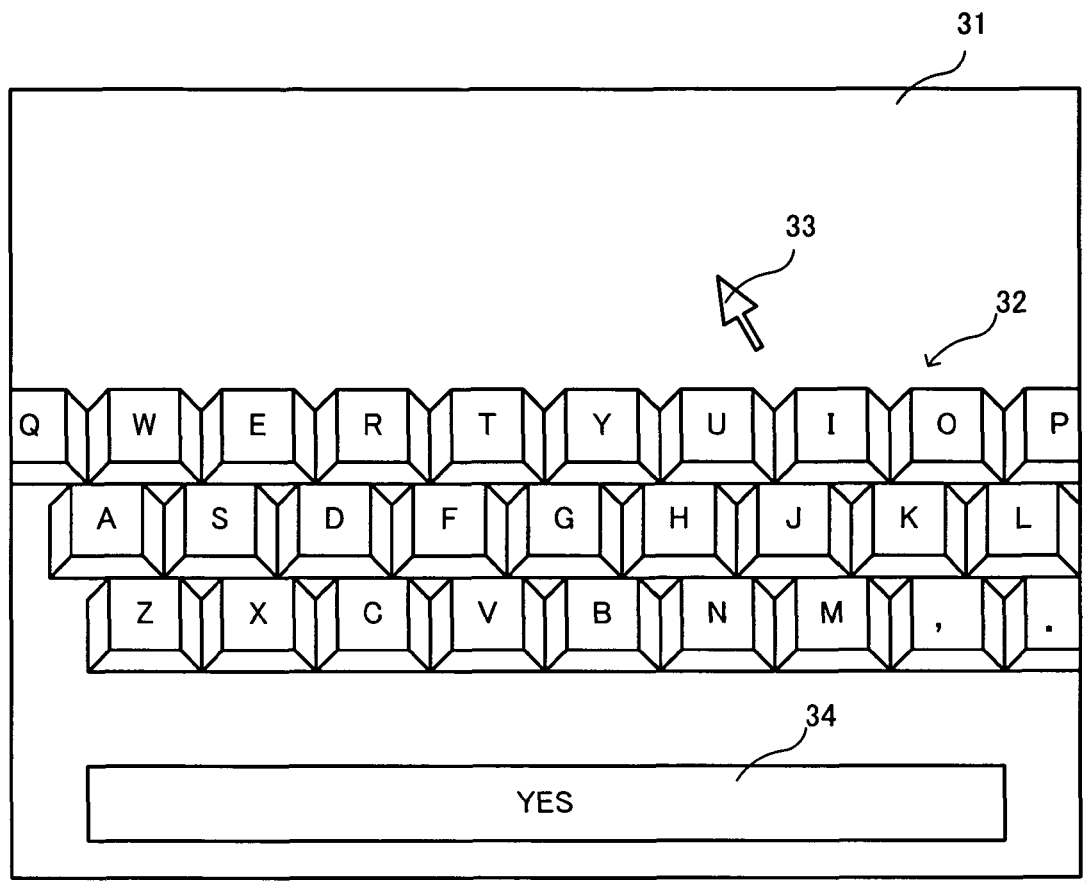
FIG. 3 is a diagram illustrating an exemplary display screen according to the first embodiment.

Next, an outline of a process performed by the game apparatus 2 by executing the game program according to the first embodiment will be described. FIG. 3 is a diagram illustrating an exemplary display screen according to the first embodiment. As shown in FIG. 3, a keyboard 32 and a cursor 33 are displayed on a display screen 31 of the television set 6. A player moves the cursor 33 using the touch pad 7 such that a desired key is designated by the cursor 33. While the desired key is being designated by the cursor 33, the player performs an operation for selecting the key, for example, presses the aforementioned switch, so as to input a character corresponding to the key. The character having been inputted is displayed on a character display area 34 in the lower portion of the display screen 31. In the following description, for example, while the display screen shown in FIG. 3 is being displayed, the player performs an operation for inputting a character using the touch pad 7 and the switch. In this case, the game apparatus 2 performs the following process.

The game apparatus 2 acquires a detection result from the touch pad 7 for each frame. Next, the game apparatus 2 calculates a position and a size (radius) of the input area in accordance with the input position and the input area size contained in the detection result having been acquired. In the present embodiment, the game apparatus 2 determines the input area as a circular area. That is, the game apparatus 2 determines, as the input area, a circular area having, at the center thereof, the input position acquired from the touch pad 7, and having a radius based on the input area size. While the touch input (input to the touch pad 7) is being detected, the game apparatus 2 calculates the position and the radius of the input area for each frame.

Further, the game apparatus 2 sets a virtual area on the input surface of the touch pad 7. A position and a radius of the virtual area are determined in accordance with the position and the radius of the input area. The virtual area represents an area virtually set on the input surface of the touch pad 7. In the present embodiment, the virtual area is circular. As the position of the virtual area, the center position of the circular virtual area is used. Since the process of determining the position and the radius of the virtual area is performed for each frame, the virtual area is transformed and/or moved for each frame. The position of the cursor 33 is determined using the position of the virtual area. Specifically, the game apparatus 2 calculates a vector ending at the position of the virtual area having been most recently determined and starting at the position of the virtual area immediately preceding the position having been most recently determined, and moves the cursor on the screen in the direction based on the direction of the vector over a distance based on a magnitude of the vector. Thus, the game apparatus 2 is operable to control the movement of the cursor using the touch input.

Next, processes of moving and transforming the virtual area will be described in detail. Initially, a state of the virtual area being moved and transformed when the player starts to make a touch input will be described with reference to FIGS. 4 to 7. In FIGS. 4 to 11, an area 41 enclosed by a dash-dot line represents the input area, and an area 42 (represented as a point only in FIG. 4) enclosed by a solid line represents the virtual area. A point 43 represents the center of the virtual area 42, that is, the position of the virtual area 42.

Figure 4:
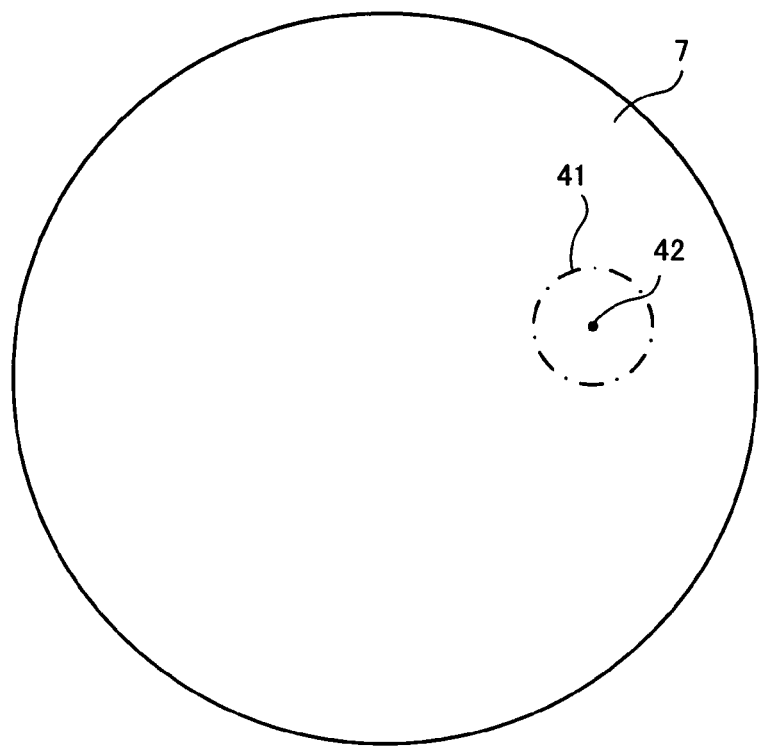
FIG. 4 is a diagram illustrating a state of an input being made at time t0 at which a touch input is started.

FIG. 4 is a diagram illustrating a state of an input being made at time t0 at which the touch input is started. An input is initially detected in a frame corresponding to time t0, that is, no input has been detected in a frame immediately preceding the frame corresponding to time t0. As shown in FIG. 4, in the frame in which the input is initially detected, the virtual area 42 is represented as a point. That is, the position and the radius of the input area 41 are determined in accordance with the input area size and the input position detected by the touch pad 7, and therefore the game apparatus 2 determines the position of the virtual area 42 as the position of the input area 41 and sets the radius of the virtual area 42 to zero.

Figure 5:
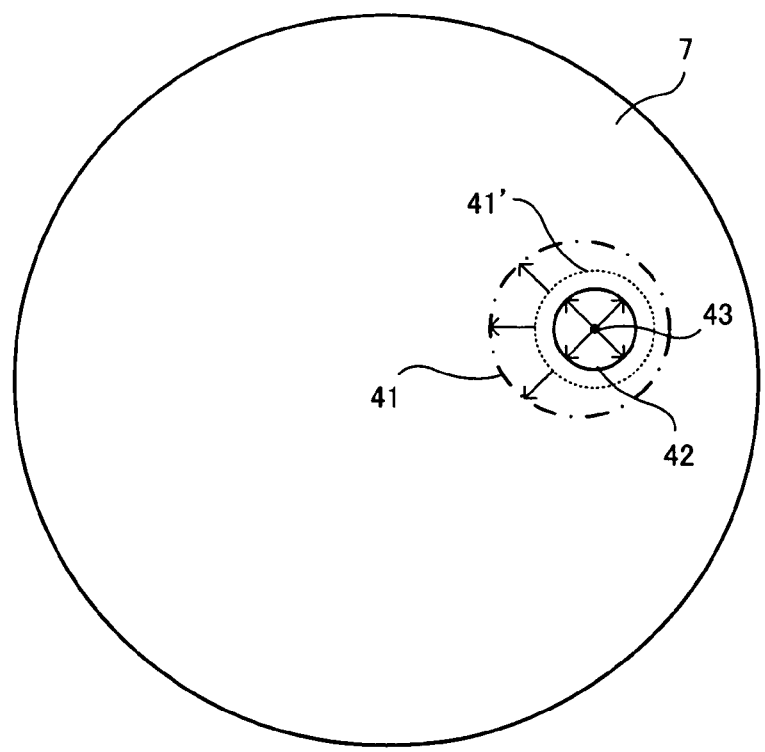
FIG. 5 is a diagram illustrating a state of the input being made at time (t0+t) at which a frame time t has passed from time t0.

FIG. 5 is a diagram illustrating a state of the input being made at time (t0+t) at which a frame time t has passed from time t0. That is, FIG. 5 is a diagram illustrating a state of the input being made in a frame immediately following the frame corresponding to time t0 as described with reference to FIG. 4. In FIG. 5, an area 41' enclosed by dotted lines represents the input area obtained in a frame immediately preceding the frame corresponding to time (t0+t). Immediately after the input to the touch pad 7 is started, the area on which the player touches the touch pad 7 with a finger is gradually increased, whereby the radius of the input area is gradually increased. As shown in FIG. 5, the input area 41 is larger than the input area having been obtained in the frame, described with reference to FIG. 4, immediately preceding the frame corresponding to time (t0+t).

On the other hand, the position and the radius of the virtual area 42 are determined so as to follow the change of the input area 41. Specifically, the radius of the virtual area 42 is determined so as to approach the radius of the input area 41. Accordingly, as shown in FIG. 5, the radius of the virtual area 42 determined at time (t0+t) is larger than the radius having been determined in the frame immediately preceding the frame corresponding to time (t0+t). The virtual area 42 is within the input area 41, and therefore the position of the virtual area 42 is not moved at time (t0+t) from the position having been determined at time immediately preceding time (t0+t). This will be described below in detail. That is, the position of the virtual area 42 is determined as being the same as the position having been determined in the frame immediately preceding the frame corresponding to time (t0+t).

Figure 6:
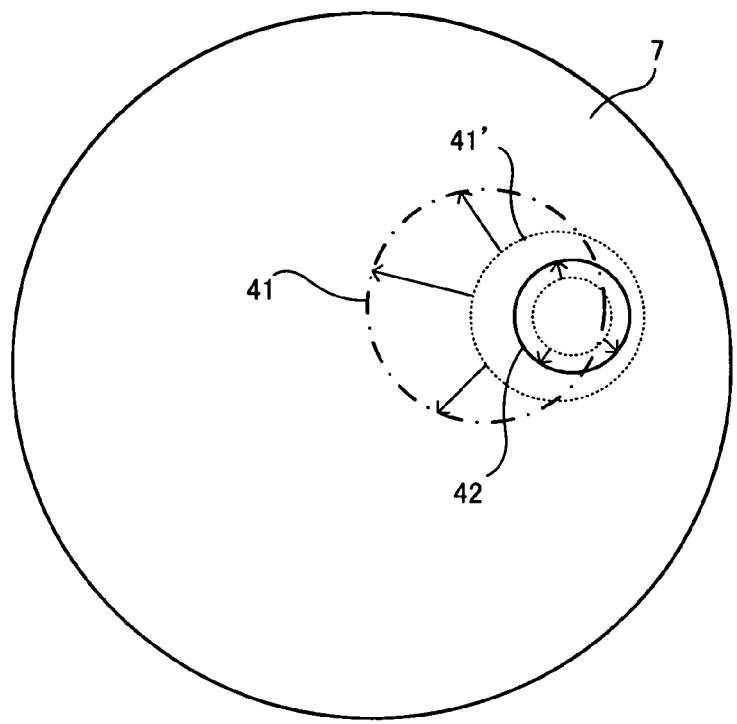
FIG. 6 is a diagram illustrating a state of the input being made at time (t0+2t) at which the frame time t has passed from time (t0+t) described with reference to FIG. 5.

FIG. 6 is a diagram illustrating a state of the input being made at time (t0+2t) at which the frame time t has passed from time (t0+t) as described with reference to FIG. 5. In FIG. 6, the area 41' enclosed by dotted lines represents the input area having been obtained in the frame immediately preceding the frame corresponding to time (t0+2t), and an area 42' represents the virtual area having been obtained in the frame immediately preceding the frame corresponding to time (t0+2t). As with at time (t0+t), at time (t0+2t), the input area 41 is larger than the input area 41' having been obtained in the frame immediately preceding the frame corresponding to time (t0+2t). The input area 41 is slightly moved toward the left of the input area 41'. As with at time (t0+t), the radius of the virtual area 42 is determined so as to approach the radius of the input area 41 at time (t0+2t). Accordingly, the radius of the virtual area 42 is larger than the radius of the virtual area 42'.

In FIG. 6, a portion of the virtual area 42 is outside the input area 41. In FIG. 6, the position of the virtual area 42 is the same as the position of the virtual area 42'. Here, the input area 41 is greater than the virtual area 42. In this case, when the determination of the radius of the virtual area 42 results in at least a portion of the virtual area 42 being outside the input area 41, the position of the virtual area 42 is corrected.

Figure 7:
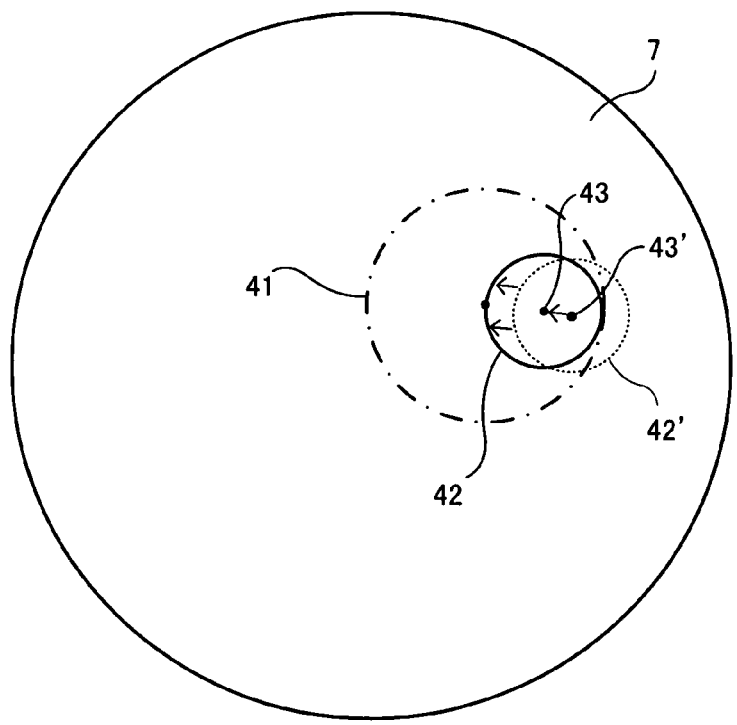
FIG. 7 is a diagram illustrating a state of the input being made after a position of a virtual area 42 has been corrected from a position shown in FIG. 6.

FIG. 7 is a diagram illustrating a state of the input being made after the position of the virtual area 42 has been corrected from the position shown in FIG. 6. As shown in FIG. 6, when at least a portion of the virtual area 42 is outside the input area 41, the virtual area 42 is moved such that the virtual area 42 is within the input area 41. Accordingly, at time (t0+2t), the position of the virtual area 42 is determined as the position represented as the point 43 shown in FIG. 7. The point 43' represents the position of the virtual area 42' having not been moved.

In frames after the frame corresponding to time (t0+2t), the position and the radius of the virtual area 42 are determined so as to follow the input area 41. Accordingly, when the input area 41 is moved, the virtual area 42 is moved in accordance with the input area 41. When the input area 41 is not changed, the position and the radius of the virtual area 42 are eventually the same as those of the input area 41.

Next, a case where the input area 41 is reduced from the preceding input area will be described with reference to FIGS. 8 to 11. Typically when the touch input is being stopped (that is, when the player removes a finger from the touch pad 7), the input area 41 is reduced from the input area obtained in the preceding frame. Further, also when the player moves the finger on the input surface, the input area 41 may be reduced from the input area obtained in the preceding frame.

Figure 8:
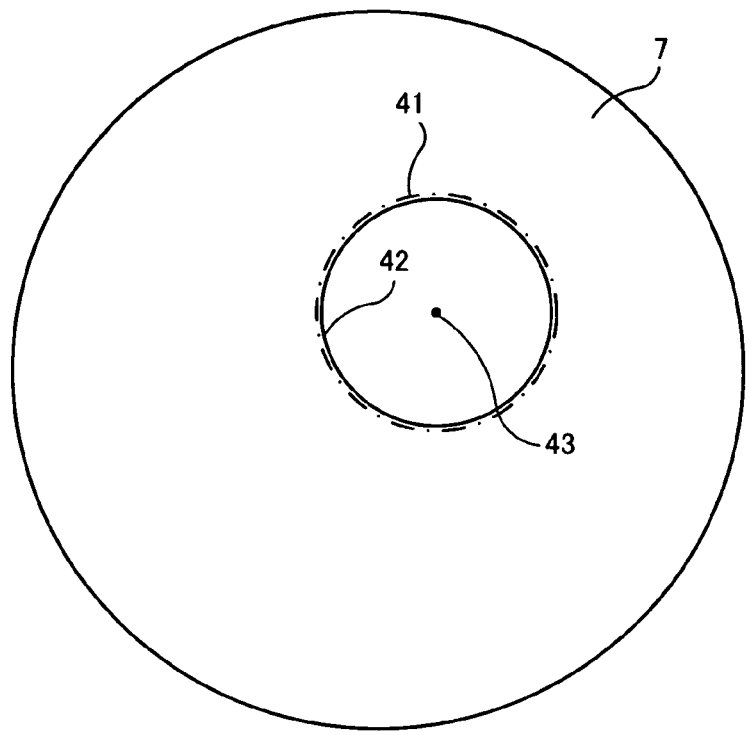
FIG. 8 is a diagram illustrating a state of the input being made at time (t1) in the process of the touch input being made.

FIG. 8 is a diagram illustrating a state of the input being made at time (t1) in the process of the touch input being made. FIG. 8 shows that the position and radius of the input area 41 are the same as those of the virtual area 42. (In FIG. 8, however, an area enclosed by the solid line is smaller than an area enclosed dash-dot line so as to easily distinguish between the two areas.)

Figure 9:
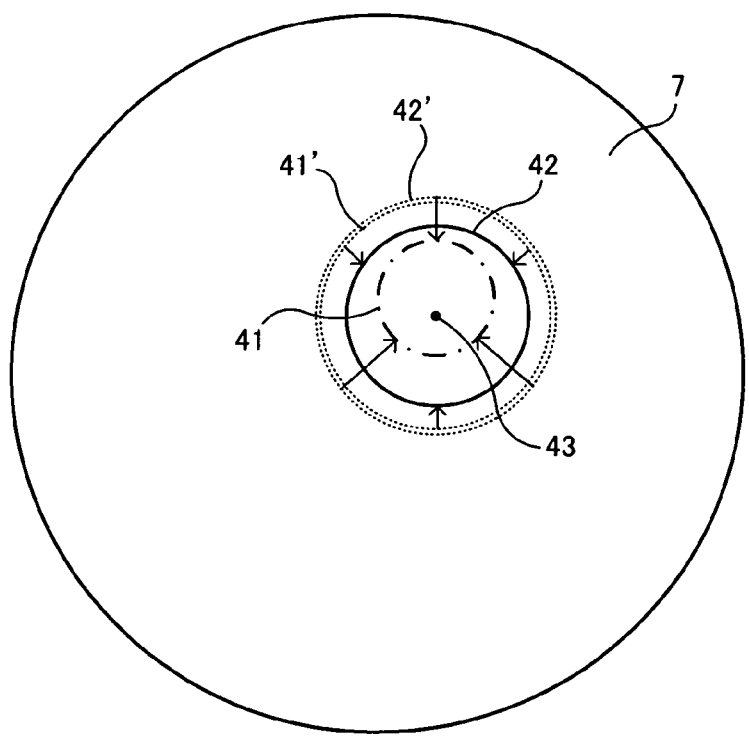
FIG. 9 is a diagram illustrating a state of the input being made at time (t1+t) at which the frame time t has passed from time t1.

FIG. 9 is a diagram illustrating a state of the input being made at time (t1+t) at which the frame time t has passed from time t1. At time (t1+t), the input area 41 is smaller than the input area 41' obtained in a frame immediately preceding the frame corresponding to time (t1+t). The virtual area 42 is determined so as to follow the input area 41. Since the input area 41 is reduced, the radius of the virtual area 42 is set so as to be smaller than that of the virtual area 42' obtained in the frame immediately preceding the frame corresponding to time (t1+t). In a case where the input area 41 is reduced as shown in FIG. 9, even when at least a portion of the virtual area 42 is outside the input area 41, the virtual area 42 is not moved. In FIG. 9, the position of the virtual area 42 is determined as being the same as the position of the virtual area obtained in the frame immediately preceding the frame corresponding to time (t1+t).

Figure 10:
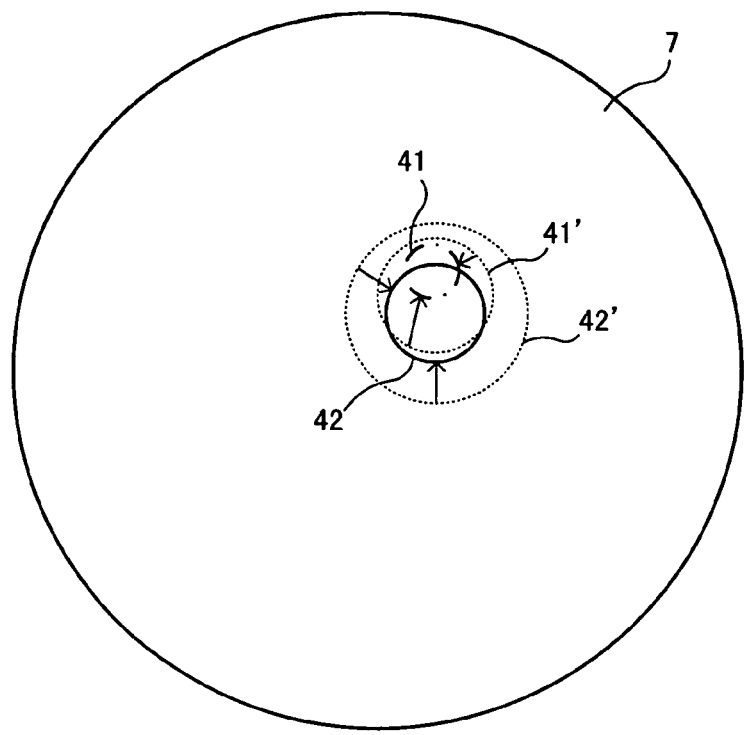
FIG. 10 is a diagram illustrating a state of the input being made at time (t1+2t) at which the frame time t has passed from time (t1+t) described with reference to FIG. 9.

FIG. 10 is a diagram illustrating a state of the input being made at time (t1+2t) at which the frame time t has passed from time (t1+t) as described with reference to FIG. 9. As with at time (t1+t), at time (t1+2t), the input area 41 is smaller than the input area 41' obtained in a frame immediately preceding the frame corresponding to time (t1+2t). The position of the input area 41 is slightly moved forward from the position of the input area 41'. The radius of the virtual area 42 is reduced so as to follow the radius of the input area 41 having been reduced. That is, the radius of the virtual area 42 is smaller than the radius of the virtual area 42'.

Here, as shown in FIG. 10, a portion of the input area 41 is outside the virtual area 42. In FIG. 10, the position of the virtual area 42 is the same as the position of the virtual area 42'. Further, the virtual area 42 is larger than the input area 41. In this case, when the determination of the radius of the virtual area 42 results in at least a portion of the input area 41 being outside the virtual area 42, the position of the virtual area 42 is corrected.

Figure 11:
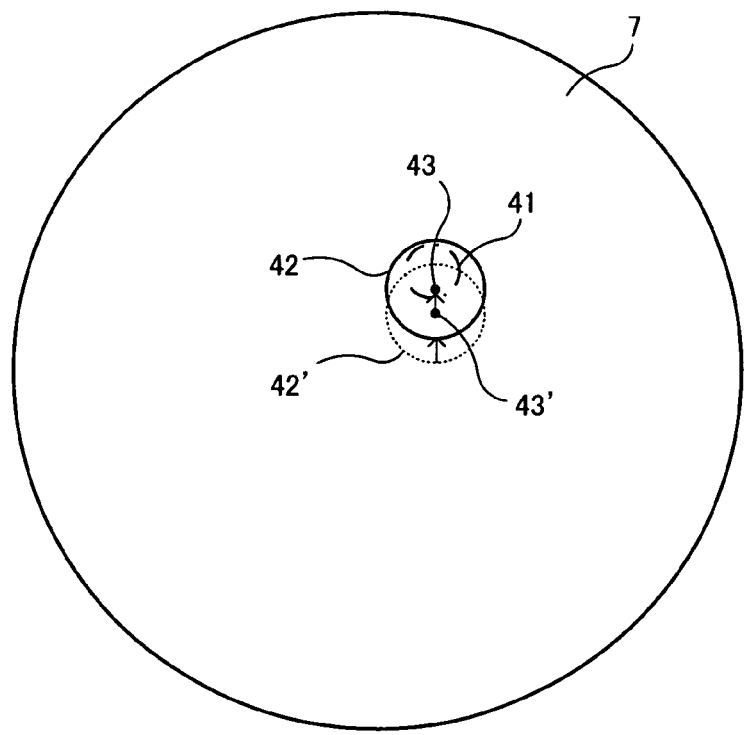
FIG. 11 is a diagram illustrating a state of the input being made after the position of the virtual area 42 has been corrected from a position shown in FIG. 10.

FIG. 11 is a diagram illustrating a state of the input being made after the position of the virtual area 42 has been corrected from the position shown in FIG. 10. When at least a portion of the input area 41 is outside the virtual area 42 as shown in FIG. 10, the virtual area 42 is moved such that the input area 41 is within the virtual area 42. Accordingly, at time (t1+2t), the position of the virtual area 42 is determined as the position represented by the point 43 shown in FIG. 11. The point 43' represents the position of the virtual area 41' having not been moved.

As shown in FIGS. 6, 7, 10, and 11, the position of the virtual area 42 is determined based on the positional relationship between the input area 41 and the virtual area 42. Specifically, the position of the virtual area 42 is determined such that the smaller one of the input area 41 or the virtual area 42 is within the larger one of the areas. More specifically, when the input area 41 is larger than the virtual area 42 as shown in FIG. 6, the position of the virtual area 42 is determined such that the virtual area 42 is within the input area 41 as shown in FIG. 7. On the other hand, when the virtual area 42 is larger than the input area 41 as shown in FIG. 10, the position of the virtual area 42 is determined such that the input area 41 is within the virtual area 42 as shown in FIG. 11. Accordingly, when the position of the input area 41 is moved, if the positional relationship between the input area 41 and the virtual area 42 does not satisfy a predetermined condition as described above, the virtual area 42 is not moved. That is, the cursor is not moved.

Also in frames after the frame corresponding to time (t0+2t), the position and the radius of the virtual area 42 are determined so as to follow the input area 41. When the touch input is no longer detected, the virtual area 42 is not set. That is, in a frame in which no touch input is detected, the process of determining the position and the radius of the virtual area 42 is not performed.

While the touch input is being made, processes as shown in FIGS. 4 to 7 for the increased input area or processes as shown in FIGS. 8 to 11 for the reduced input area are performed for each frame. Accordingly, the virtual area is changed so as to follow the input area while the touch input is being made. Specifically, the radius of the virtual area 42 is determined so as to follow the radius of the input area 41.

Here, immediately after the touch input is started and immediately before the touch input is stopped, the radius of the input area is substantially changed. Accordingly, the change of the radius causes the change of the position of the input area. If the cursor is moved based on the position of the input area, the cursor may be moved against the player's intention. That is, immediately after the input is started and immediately before the input is stopped, the input position is likely to be changed against the player's intention, and therefore the change of the input position may cause the movement of the cursor regardless of the player's intention. This problem is significant immediately after the input is started and immediately before the input is stopped. However, this problem may occur at any time while the touch input is being made.

For example, in FIG. 3, a player, who attempts to input "A", moves the cursor 33 to a position designated by a key corresponding to "A". Further, the player presses the touch pad 7 so as to select the key corresponding to "A". At this time, the touch pad 7 having been pressed may increase the size of the area (radius of the input area) on which the player touches the touch pad 7 with a finger. Therefore, the center position of the input area, that is, the position of the input area is moved, thereby moving the cursor 33. For example, the cursor 33 may be moved backward, thereby designating a key corresponding to "Z". That is, the cursor 33 is designating the key corresponding to "Z" when the switch detects that the touch pad 7 has been pressed, thereby resulting in the character "Z" being inputted. That is, an operation unintended by the player will be performed.

Therefore, in the present embodiment, the virtual area, which is changed so as to follow the input area, is set and the cursor is moved based on the position of the virtual area. As shown in FIGS. 4 to 11, even when the radius of the input area is substantially changed, the radius of the virtual area is changed more slowly than the radius of the input area. Further, the position of the virtual area is determined based on the positional relationship between the input area and the virtual area, and the change of the position of the input area does not always cause the movement of the virtual area. Accordingly, even when the radius of the input area is substantially changed, the virtual area is not moved or the virtual area is moved over a reduced distance relative to the input area, that is, at a slower rate than the input area. Therefore, when the touch pad 7 is controlled with a finger, an operation unintended by the player, which is likely to occur immediately after the input is started or immediately before the input is stopped, can be prevented.

The input area size changes when the operator moves, on the input surface, a finger touching the input surface, in addition to when the operator attempts to remove the finger from the input surface or when the operator starts to touch the input surface with the finger. For example, when the player moves the finger from left to right on the input surface, the player attempts to move the finger from left to right so as to form a straight line. In this case, the movement of the finger causes the change of the input area size, whereby the center position of the input area may move so as to wobble forward and backward. At this time, if the cursor is moved based on the position of the input area, the cursor may move from left to right with wobbling forward and backward, resulting in the operation unintended by the player being performed. Even in this case, when the cursor is moved based on the virtual area as described in the present embodiment, the operation unintended by the player can be prevented.

Figure 12:
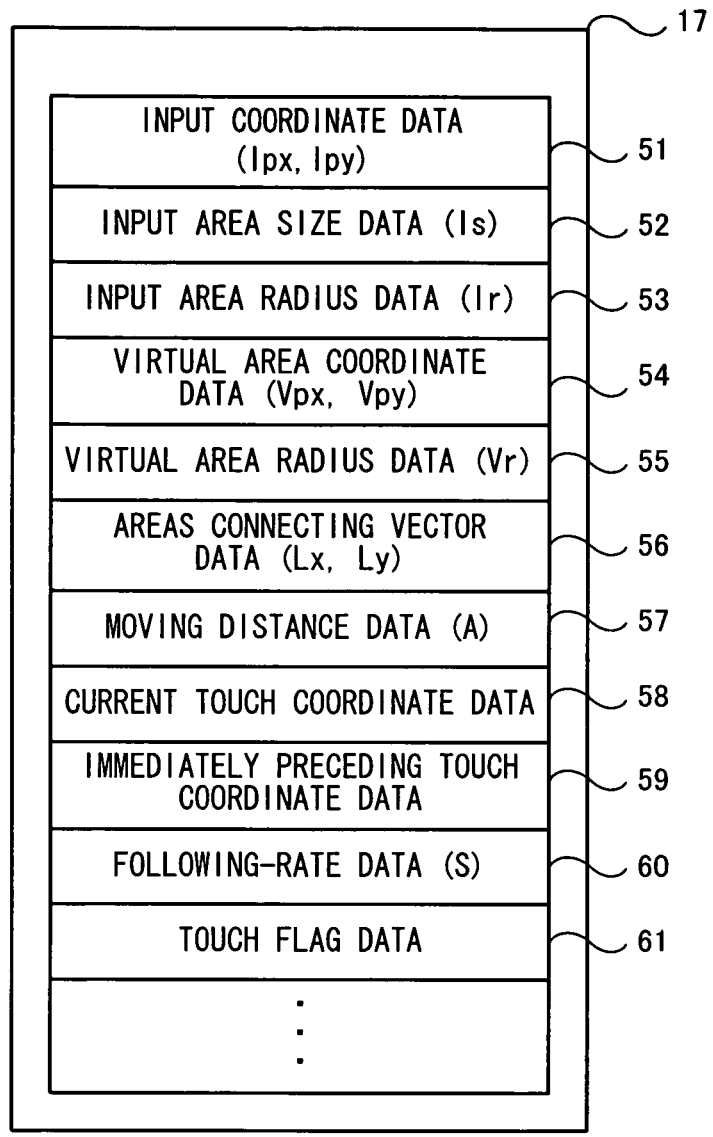
FIG. 12 is a diagram illustrating main data to be stored in a main memory 17 of the game apparatus 2.

Next, a game process performed by the game apparatus 2 by executing the game program will be described in detail. Initially, main data used for the game process will be described with reference to FIG. 12. FIG. 12 is a diagram illustrating main data to be stored in the main memory 17 of the game apparatus 2. As shown in FIG. 12, the main memory 17 stores: input coordinate data 51; input area size data 52; input area radius data 53; virtual area coordinate data 54; virtual area radius data 55; areas connecting vector data 56; moving distance data 57; current touch coordinate data 58; immediately preceding touch coordinate data 59; following-rate data 60; touch flag data 61 and the like. The main memory 17 stores data required for the game process such as data (image data of objects and the like) relating to the objects (key board 32 shown in FIG. 3, and the like) to be displayed on the screen, in addition to the data shown in FIG. 12.

The input coordinate data 51 represents coordinates of the input position detected by the touch pad 7. The input area size data 52 represents the input area size detected by the touch pad 7. The CPU 11 acquires, for each frame, data representing the input position and the input area size detected by the touch pad 7 via the controller 5, and stores, in the main memory 17, the acquired data as the input coordinate data 51 and the input area size data 52, respectively. Hereinafter, the coordinates of the input position on the input surface are represented as (Ipx, Ipy) and the input area size is represented as Is.

The input area radius data 53 represents a radius of the input area determined as a circular area. The radius of the input area is calculated in accordance with the input area size. Hereinafter, the radius of the input area is represented as Ir.

The virtual area coordinate data 54 represents coordinates representing a position of the virtual area. Further, the virtual area radius data 55 represents a radius of the virtual area. The virtual area coordinate data 54 and the virtual area radius data 55 are updated for each frame while the touch input is being detected. On the other hand, in a frame in which no touch input is detected, the virtual area coordinate data 54 and the virtual area radius data 55 are not stored in the main memory 17. Hereinafter, the coordinates representing the position of the virtual area are represented as (Vpx, Vpy), and the radius of the virtual area is represented as Vr.

The areas connecting vector data 56 represents a two-dimensional vector (areas connecting vector) starting at the position of the input area and ending at the position of the virtual area. Hereinafter, the areas connecting vector is represented as (Lx, Ly). The moving distance data 57 represents a moving distance over which the virtual area is moved for each frame. Hereinafter, the moving distance is represented as "A".

The current touch coordinate data 58 represents coordinates of a position which is determined, by the game apparatus 2, as a position at which a player has made a touch input. Hereinafter, the coordinates are referred to as "touch coordinates". Specifically, the touch coordinates represent a current virtual area. The game apparatus 2 performs a game process (a process of moving the cursor in the present embodiment) in accordance with the touch coordinates. The current touch coordinate data 58, which represents current touch coordinates, is updated for each frame while the touch input is being detected, as described for the virtual area coordinate data 54. The immediately preceding touch coordinate data 59 represents touch coordinates immediately preceding the current touch coordinates. That is, when the game apparatus 2 calculates new touch coordinates, the current touch coordinate data 58 has its data updated to the data representing the new touch coordinates having been calculated, and the updated data is stored in the main memory 17. The immediately preceding touch coordinate data 59 has its data updated to the current touch coordinate data 58 which has not had its data updated to the data representing the new touch coordinates, and the updated data is stored in the main memory 17.

The following-rate data 60 represents a following-rate. The following-rate represents an index indicating a rate at which the virtual area follows the input area. Here, the following-rate S is set so as to satisfy $0<S<1$. When the value of the following-rate S is increased, the virtual area is changed so as to follow the input area at an increased rate. On the other hand, when the value of the following-rate S is reduced, the virtual area is changed so as to follow the input area at a reduced rate. The value of the following-rate S may be preset in the game program. In this case, the game apparatus 2 may read the value of the following-rate S having been preset and stores the same in the main memory 17. Alternately, the value of the following-rate S may be determined as necessary based on a game state or an instruction from a player.

The touch flag data 61 represents a flag indicating whether or not the touch input is being currently made. Specifically, when an input to the touch pad 7 is being made, the flag has its value set to "1". On the other hand, when no input is made to the touch pad 7, the flag has its value set to "0".

Figure 13:
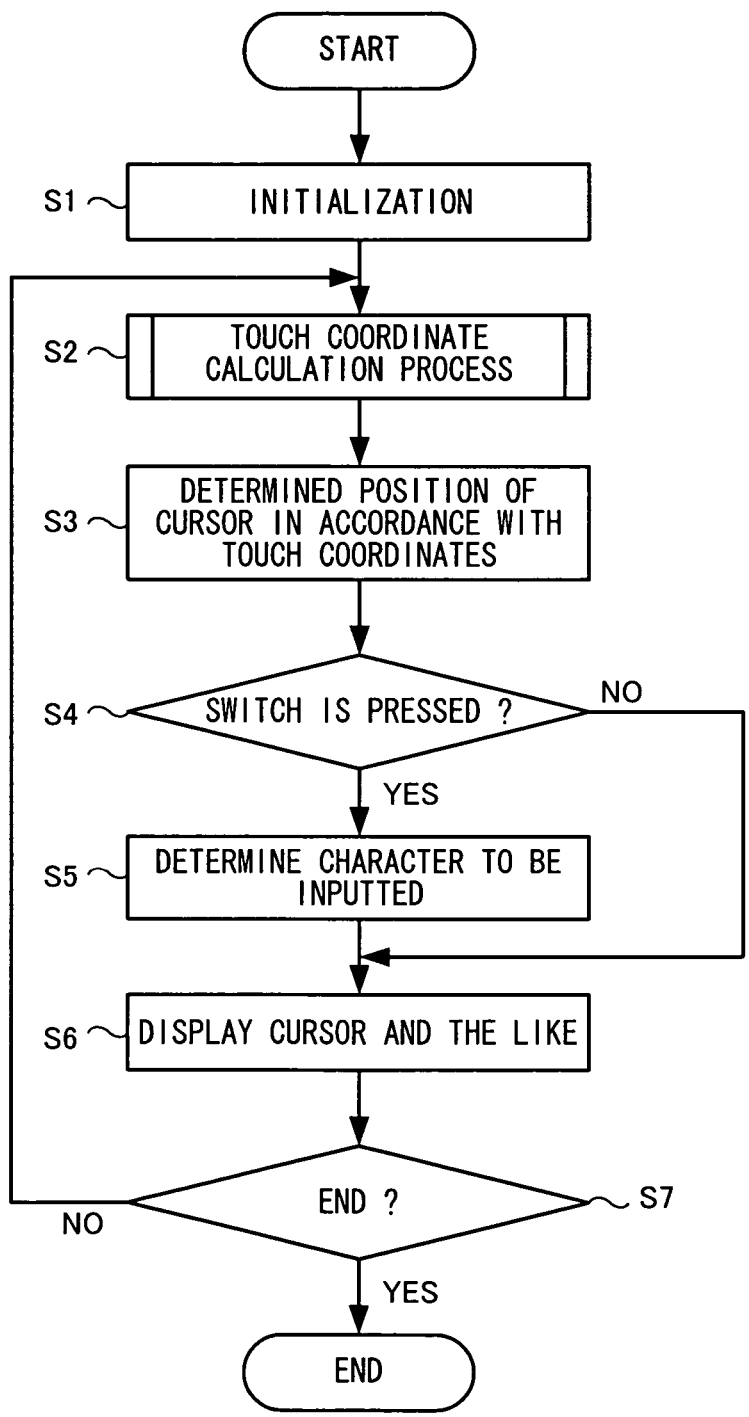
FIG. 13 is a flow chart illustrating a flow of a game process performed by the game apparatus 2 according to the first embodiment.
Figure 14:
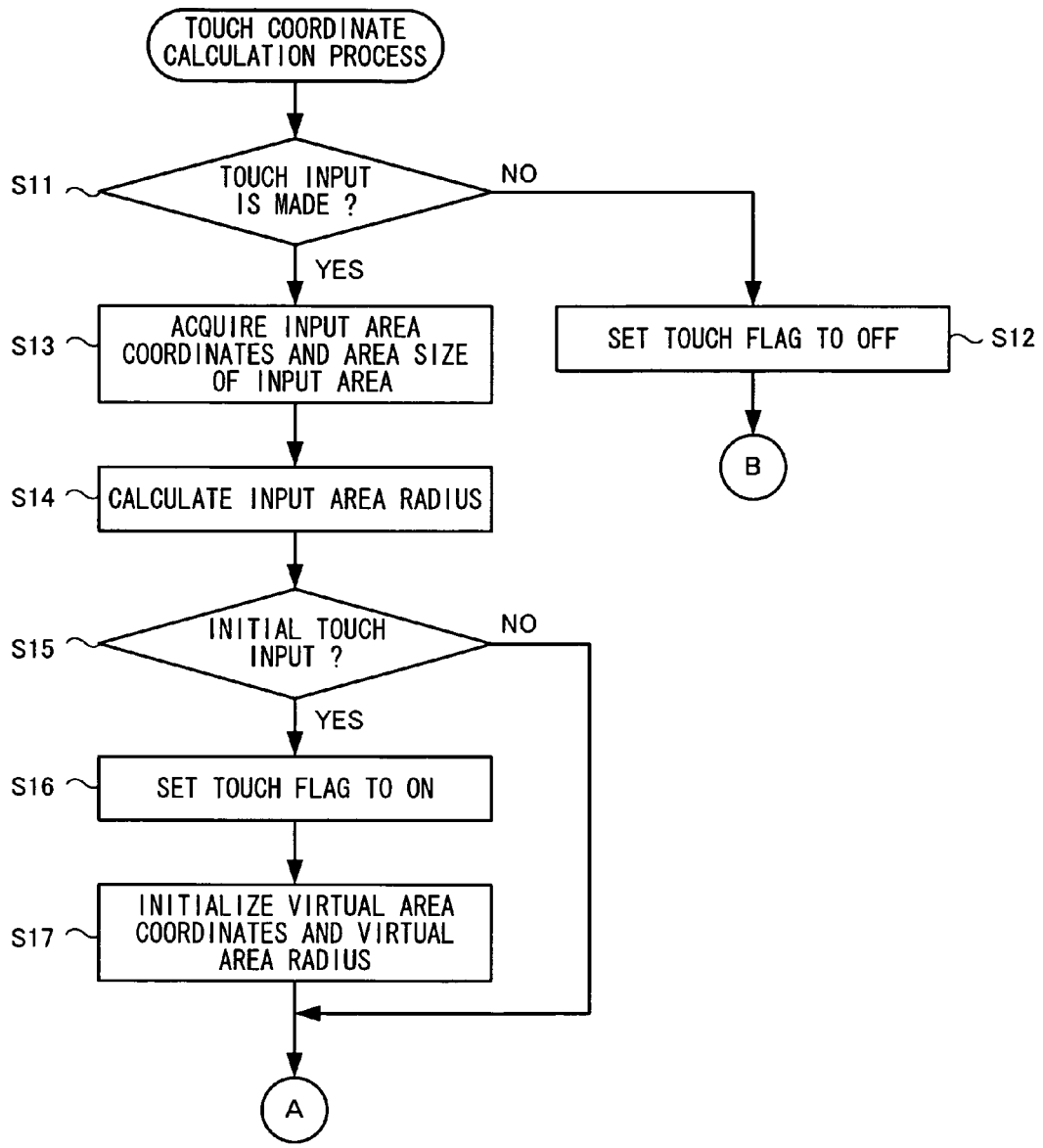
FIG. 14 is a flow chart illustrating in detail a flow of a touch coordinate calculation process shown in FIG. 13.
Figure 15:
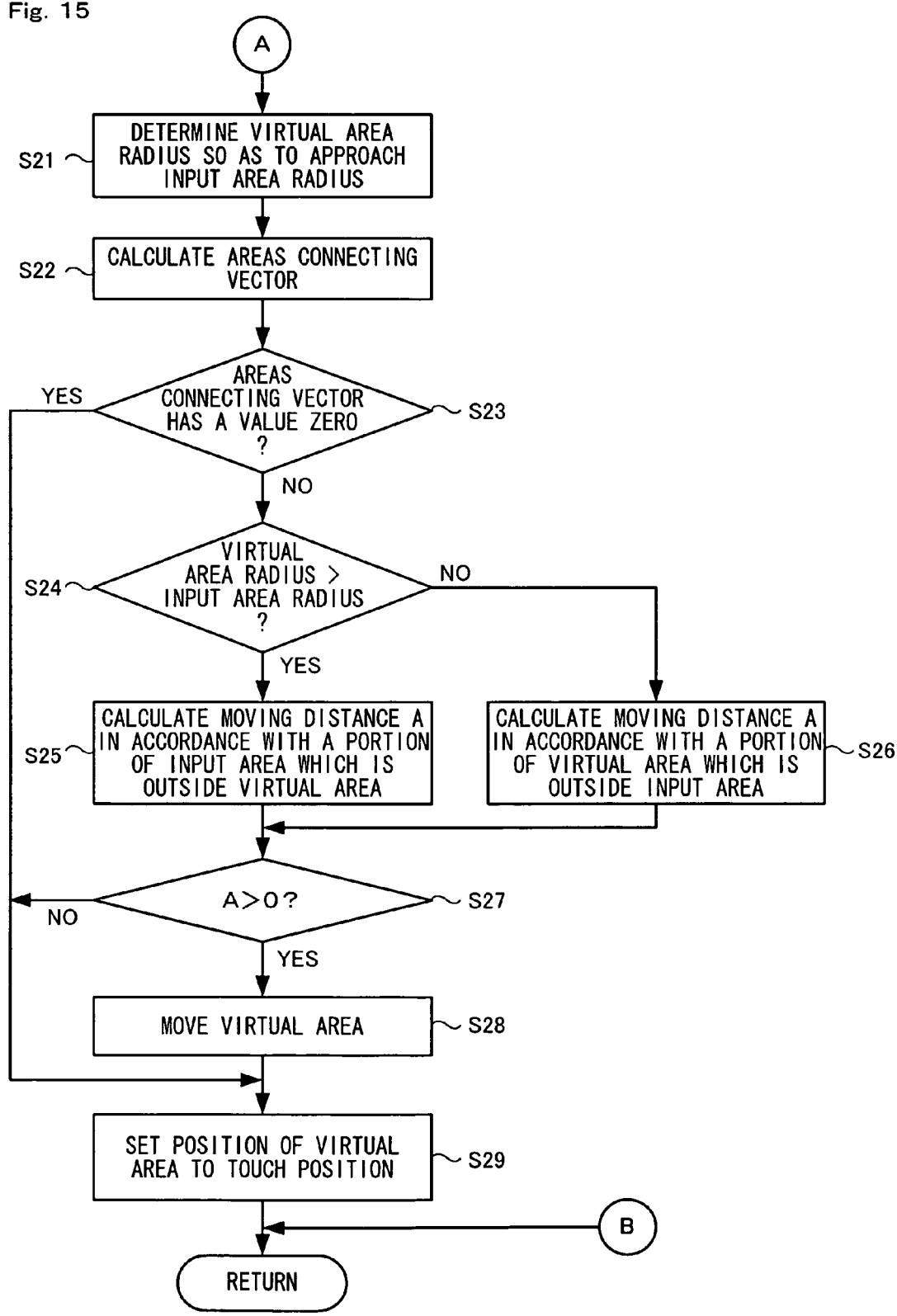
FIG. 15 is a flow chart illustrating in detail a flow of the touch coordinate calculation process shown in FIG. 13.

Next, the game process performed by the game apparatus 2 by executing the game program will be described in detail with reference to FIGS. 13 to 15. FIG. 13 is a flow chart illustrating a flow of the game process performed by the game apparatus 2. When the game apparatus 2 is powered on, the CPU 11 of the game apparatus 2 executes a boot program stored in a boot ROM not shown so as to initialize each unit such as the main memory 17. The game program stored in the optical disc 3 is loaded into the main memory 17, and the CPU 11 starts to execute the game program. FIG. 13 shows the flow chart of the game process performed after the aforementioned processes are completed. FIGS. 13 to 15 show flow charts illustrating in detail the process of moving the cursor based on the input made to the touch pad 7, among the entire game process. The other processes which are not directly relevant to the present example embodiments are not described in detail.

In step S1 shown in FIG. 13, the initialization is performed. Specifically, the following-rate data 60 representing a value of the following-rate S is stored in the main memory 17. Further, in step S1, the keyboard 32, the cursor 33, and the character display area 34 are displayed on the screen of the television set 6 as shown in FIG. 3. After the initialization in step S1 is completed, the game is started and a process loop of steps S2 to S12 is repeated for each frame so as to play the game.

In step S2, the touch coordinate calculation process is performed. In the touch coordinate calculation process, the touch coordinates are calculated based on the touch input made by a player. Hereinafter, the touch coordinate calculation process will be described in detail with reference to FIGS. 14 and 15.

FIGS. 14 and 15 are flow charts illustrating in detail a flow of the touch coordinate calculation process (S2) shown in FIG. 13. In the touch coordinate calculation process, it is determined in step S11 whether or not an input to the touch pad 7 has been made. Specifically, the CPU 11 reads the operation data outputted by the controller 5 so as to determine whether or not data representing the input position and the input area size is contained the operation data. When the operation data contains the data representing the input position and the input area size, it is determined that the input to the touch pad 7 is being made, and the process advances to step S13. On the other hand, when the operation data does not contain the data representing the input position and the input area size, and the operation data contains data indicating that no input is made to the touch pad 7, it is determined that no input has been made to the touch pad 7, and the process advances to step S12.

In step S12, the touch flag is set to OFF. That is, the CPU 11 sets, to "0", a value of the touch flag data 61 stored in the main memory 17. Following step S12, the CPU 11 ends the touch coordinate calculation process. That is, when no touch input is made, no touch coordinates are calculated.

On the other hand, in step S13, the input position and the input are a size on the touch pad 7 are acquired. Specifically, the CPU 11 stores data representing the coordinates of the input position and the input area size contained in the operation data having been read in step S11, in the main memory 17, as the input coordinate data 51 and the input area size data 52, respectively. In the following step S14, the radius of the input area is calculated in accordance with the input area size having been acquired in step S13. A shape of the input area is determined as a circular area having the same area size as the input area, and the radius of the circular area is calculated as the radius of the input area. The data representing the radius having been calculated is stored as the input area radius data 53 in the main memory 17.

In step S15, it is determined whether or not the touch input having been detected in step S11 is an initial touch input. Here, the initial touch input is a touch input detected in a current frame when no touch input has been detected in a frame immediately preceding the current frame. Specifically, the determination in step S15 is performed with reference to the touch flag data 61 stored in the main memory 17. That is, when the touch flag data 61 represents a value "0", the touch input detected in step S11 is determined as the initial touch input. When the touch flag data 61 represents a value "1", it is determined that the touch input detected in step S11 is not the initial touch input. When the touch input detected in step S11 is determined as the initial touch input, steps S16 and S17 are performed. On the other hand, when it is determined that the touch input detected in step S11 is not the initial touch input, steps S16 and S17 are skipped and the process advances to step S21.

In step S16, the touch flag is set to "ON". That is, the CPU 11 sets, to "1", a value of the touch flag data 61 stored in the main memory 17. In the following step S17, values of the coordinates and the radius of the virtual area are initialized. Specifically, the coordinates (Vpx, Vpy) of the virtual area are determined based on the coordinates (Ipx, Ipy) of the input position. That is, the CPU 11 determines, based on the input coordinate data 51 stored in the main memory 17, the coordinates of the virtual area such that Vpx=Ipx and Vpy=Ipy are satisfied. Further, the radius Vr of the virtual area is determined so as to satisfy Vr=0. Data representing the coordinates and the radius of the virtual area having been determined as described above are stored in the main memory 17 as the virtual area coordinate data 54 and the virtual area radius data 55, respectively. Following step S17, the process advances to step S21.

In step S21, the radius of the virtual area is changed so as to approach the radius of the input area. The radius Vr of the virtual area is calculated based on the following-rate S, the radius Ir of the input area, and the radius (Vr') of the virtual area having been most recently calculated. The CPU 11 calculates the radius Vr of the virtual area according to the following equation 1 using the input area radius data 53, the virtual area radius data 55 and following-rate data 60, which are stored in the main memory 17.

$$Vr=Vr'+(Ir-Vr')\times S \qquad \text{equation 1}$$

The virtual area radius data 55 has its data updated to the data representing the changed radius Vr of the virtual area having been calculated according to equation 1, and the updated data is stored in the main memory 17.

In the following step S22, the areas connecting vector is calculated. As described above, the areas connecting vector represents a vector starting at the position of the input area and ending at the position of the virtual area. The areas connecting vector (Lx, Ly) is calculated based on the position coordinates (Ipx, Ipy) (that is, input coordinates) of the input area and the position coordinates (Vpx, Vpy) of the virtual area. The CPU 11 calculates the areas connecting vector (Lx, Ly) according to the following equation 2 using the input coordinate data 51 and the virtual area coordinate data 54, which are stored in the main memory 17.

$$Lx=Ipx-Vpx$$

$$Ly=Ipy-Vpy \qquad \text{equation 2}$$

The areas connecting vector data 56 has its data updated to the data representing the areas connecting vector (Lx, Ly) having been calculated according to equation 2, and the updated data is stored in the main memory 17. In step S22, the CPU 11 further calculates a magnitude of the areas connecting vector (Lx, Ly) having been calculated according to equation 2.

In step S23, it is determined whether or not the magnitude of the areas connecting vector (Lx, Ly) having been calculated in step S22 has a value "0". When it is determined in step S23 that the magnitude of the areas connecting vector has a value "0", steps S24 to S28, which will be described below, are skipped and the process advances to step S29. When the magnitude of the areas connecting vector has a value "0", the position of the input area is the same as the position of the virtual area. In this case, it is unnecessary to move the virtual area, and therefore steps S24 to S28, which are process steps of moving the virtual area, are skipped. On the other hand, when it is determined in step S23 that the magnitude of the areas connecting vector has a value other than zero, the process advances to step S24.

In step S24, it is determined whether or not the radius Vr of the virtual area is larger than the radius Ir of the input area. The CPU 11 determines whether or not Vr>Ir is satisfied based on the input area radius data 53 and the virtual area radius data 55, which are stored in the main memory 17. As described above, the method for calculating the moving distance over which the virtual area is to be moved is different depending on whether the radius of the virtual area is larger than the radius of the input area or the radius of the virtual area is smaller than the radius of the input area. In step S24, a process of determining the method for calculating the moving distance is performed. When it is determined in step S24 that the radius Vr of the virtual area is larger than the radius Ir of the input area, the process advances to step S25. On the other hand, when it is determined in step S24 that the radius Vr of the virtual area is smaller than or equal to the radius Ir of the input area, the process advances to step S26.

In step S25, the moving distance A of the virtual area is calculated. In step S25, as the moving distance A, calculated is a length of a portion of the input area which is outside the virtual area. That is, the virtual area is moved over a distance corresponding to the length of the portion of the input area which is outside the virtual area. In other words, the virtual area is moved such that the entire input area is within the virtual area. Specifically, the CPU 11 calculates the distance (moving distance A) corresponding to the length of the portion of the input area which is outside the virtual area according to equation 3 using the input area radius data 53, the virtual area radius data 55, and the areas connecting vector data 56.

$$A=(L+Ir)-Vr \qquad \text{equation 3}$$

where L represents the magnitude of the areas connecting vector. When the moving distance A has a negative value according to equation 3, the entire input area is within the virtual area, that is, the circumference of the input area does not intersect with the circumference of the virtual area. When the moving distance A has a value "0" according to equation 3, the input area is within the virtual area such that the circumference of the input area intersects with the circumference of the virtual area at one point. When the moving distance A has a positive value according to equation 3, the circumference of the input area intersects with the circumference of the virtual area at two points, or the input area is outside the virtual area such that the circumference of the input area intersects with the circumference of the virtual area at one point, or the entire input area is outside the virtual area (that is, the circumference of the input area does not intersect with the circumference of the virtual area). The moving distance data 57 has its data updated to the data representing the moving distance A calculated according to equation 3, and the updated data is stored in the main memory 17. Following step S25, the process advances to step S27.

On the other hand, in step S26, as in step S25, the moving distance A of the virtual area is calculated. In step S26, as the moving distance A, calculated is a length of a portion of the virtual area which is outside the input area. That is, the virtual area is moved over a distance corresponding to the length of the portion of the virtual area which is outside the input area. In other words, the virtual area is moved such that the entire virtual area is within the input area. Specifically, the CPU 11 calculates the distance (moving distance A) corresponding to the length of the portion of the virtual area which is outside the input area according to equation 4 using the input area radius data 53, the virtual area radius data 55, and the areas connecting vector data 56.

$$A=(L+Vr)-Ir \quad \text{equation 4}$$

where L represents the magnitude of the areas connecting vector. When the moving distance A has a negative value according to equation 4, the entire virtual area is within the input area, that is, the circumference of the virtual area does not intersect with the circumference of the input area. When the moving distance A has a value "0" according to equation 4, the virtual area is within the input area such that the circumference of the virtual area intersects with the circumference of the input area at one point. When the moving distance A has a positive value according to equation 4, the circumference of the virtual area intersects with the circumference of the input area at two points, or the virtual area is outside the input area such that the circumference of the virtual area intersects with the circumference of the input area at one point, or the entire virtual area is outside the input area (that is, the circumference of the virtual area does not intersect with the circumference of the input area). The moving distance data 57 has its data updated to the data representing the moving distance A calculated according to equation 4, and the updated data is stored in the main memory 17. Following step S26, the process advances to step S27.

In step S27, it is determined whether or not the moving distance A having been calculated in step S25 or S26 has a positive value. That is, the CPU 11 determines whether or not the moving distance A represented by the moving distance data 57 stored in the main memory 17 is larger than zero. When A≤0 is satisfied, the smaller one of the input area or the virtual area is within the larger one of the areas. At this time, it is unnecessary to move the virtual area. That is, in step S27, it is determined whether or not it is necessary to move the virtual area. When it is determined in step S27 that the moving distance A has a positive value, the virtual area is moved in step S28. On the other hand, when it is determined that the moving distance A has a value other than a positive value (that is, the moving distance A has a negative value or a value "0"), step S28 is skipped and the process advances to step S29.

In step S28, the position of the virtual area is moved over the moving distance A having been calculated in step S25 or S26. The position coordinates (Vpx, Vpy) to which the virtual area is to be moved are calculated using the moving distance A, the areas connecting vector (Lx, Ly), and the position coordinates (Vpx', Vpy') (coordinates represented by the virtual area coordinate data 54 obtained before the process of step S28) of the virtual area having been most recently set. Specifically, the CPU 11 calculates the position to which the virtual area is to be moved, according to the following equation 5, using the virtual area coordinate data 54, the areas connecting vector data 56, and the moving distance data 57, which are stored in the main memory 17.

$$Vpx=Vpx'+Lx/L\times A$$

$$Vpy=Vpy'+Ly/L\times A \quad \text{equation 5}$$

wherein L represents the magnitude of the areas connecting vector. According to equation 5, the virtual area is moved from the center position of the virtual area toward the center position of the input area over the length corresponding to the moving distance A. The virtual area coordinate data 54 has its data updated to the data representing the position coordinates (Vpx, Vpy) of the virtual area having been calculated according to equation 5, and the updated data is stored in the main memory 17. Following step S28, the process advances to step S29.

In step S29, coordinates representing the position of the virtual area are set to the touch coordinates. That is, by using the CPU 11, the current touch coordinate data 58 has its data updated to the coordinate value represented by the virtual area coordinate data 54 stored in the main memory 17, and the updated data is stored in the main memory 17. At this time, the immediately preceding touch coordinate data 59 has its data updated to the coordinate value represented by the current touch coordinate data 58 immediately preceding the current touch coordinate data 58 updated in step S29, and the updated data is stored in the main memory 17. Thus, the position coordinates (that is, the touch coordinates), which is determined as being designated by a player, can be calculated based on the touch input made by the player. After step S29 is completed, the CPU 11 ends the touch coordinate calculation process.

Returning to FIG. 13, following step S2, in step S3, a position of the cursor on the screen is determined using the touch coordinates having been calculated in step S2. The CPU 11 initially calculates a vector ending at a position of current touch coordinates and starting at a position of touch coordinates immediately preceding the current touch coordinates. The vector can be calculated based on coordinates represented by the current touch coordinate data 58 stored in the main memory 17 and coordinates represented by the immediately preceding touch coordinate data 59 stored in the main memory 17. Further, the CPU 11 moves the cursor on the screen based on this vector. The CPU 11 moves the cursor on the screen over a length corresponding to the magnitude of the vector in the direction based on the direction of the vector. Thus, the cursor can be moved to the position determined in step S3. When no touch input is made, that is, when the touch flag is set to OFF, the CPU 11 does not move the cursor. Further, as the method for moving the cursor, another method may be used. For example, the positions on the input surface of the touch pad 7 are stored so as to be associated with the positions on the screen, and the cursor may be moved to the position, on the screen, corresponding to the position of the touch coordinates having been calculated in step S2.

In step S4, it is determined whether or not the switch provided on the reverse side of the touch pad 7 has been pressed. The operation data having been read in step S11 contains the data indicating whether or not the switch has been pressed. Based on the data indicating whether or not the switch has been pressed, the CPU 11 determines whether or not the switch has been pressed. When it is determined that the switch has been pressed, the process advances to step S5. On the other hand, when it is determined that the switch is not pressed, the step S5 is skipped and the process advances to step S6.

In step S5, the key designated by the cursor having its position determined in step S3 is identified. As a result, a character corresponding to the key having been identified is inputted.

In step S6, the display process is performed. Specifically, the cursor is displayed at the position having been determined in step S3 on the screen of the television set 6, in addition to images of the keyboard 32 and the character display area 34, as shown in FIG. 3. Further, when step 5 has been performed, the character having been determined in step S5 is displayed on the character display area 34 with the keyboard and the cursor being displayed. Following step S6, the process advances to step S7.

In step S7, it is determined whether or not the game is to be ended. It is determined whether or not the game is to be ended based on, for example, whether or not a player has performed a predetermined operation for ending the game. When it is determined in step S7 that the game is to be ended, the CPU 11 ends the game process shown in FIG. 13. On the other hand, when it is determined that the game is not to be ended, the process returns to step S2 and the process loop of steps S2 to S7 is repeated until it is determined in step S7 that the game is to be ended.

As described above, according to the first embodiment, the game apparatus 2 sets the virtual area which is different from the input area, and changes the virtual area so as to follow the input area. The operation intended by the player is determined using the virtual area. Thus, it is possible to prevent an operation unintended by the player from being performed due to the input area being changed against the player's intention.

In the first embodiment, the position of the virtual area is used to perform the process of moving the position of the cursor 33 on the screen. In another embodiment, the game apparatus 2 may perform a predetermined process in accordance with the virtual area. The content of the predetermined process may be determined in accordance with a shape and/or an area size of the virtual area in addition to the position of the virtual area.

Second Embodiment

Hereinafter, a second example embodiment will be described. An object of the second embodiment is to prevent an operation unintended by a player from being performed due to the input area being changed when the switch provided on the reverse side of the input surface of the touch pad 7 is pressed. That is, when the switch is pressed, the input surface is more strongly pressed than when the input surface is just touched, thereby increasing the input area and changing the input position. Accordingly, when the cursor is moved based on the input position, the switch being pressed may cause the movement of the cursor (regardless of whether or not this movement is intended by the player), resulting in an operation unintended by the player being performed. In the second embodiment, solved is the problem that the cursor is moved in the direction unintended by the player when the switch is pressed.

The game apparatus according to the second embodiment is the same as the game apparatus 2 shown in FIGS. 1 and 2, and therefore the game apparatus 2 is not described in detail. A game process performed by the game apparatus 2 according to the second embodiment is different from that described for the first embodiment. In the second embodiment, the game process will be mainly described.

Figure 16:
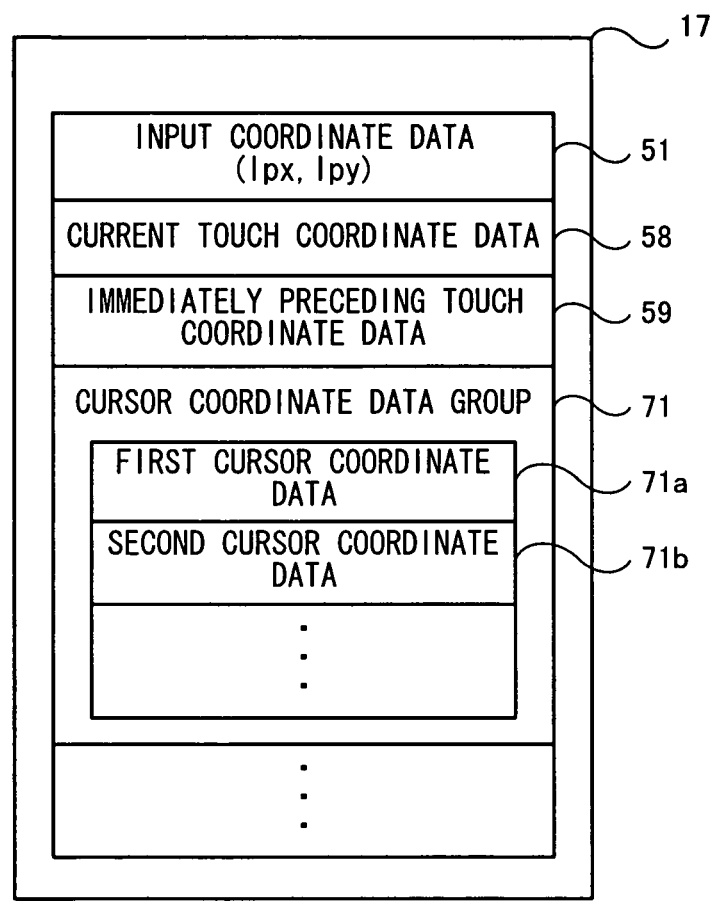
FIG. 16 is a diagram illustrating main data to be stored in the main memory 17 of the game apparatus 10 according to a second embodiment.

FIG. 16 is a diagram illustrating main data to be stored in the main memory 17 of the game apparatus 2 according to the second embodiment. As shown in FIG. 16, the main memory 17 stores: input coordinate data 51; current touch coordinate data 58; immediately preceding touch coordinate data 59; and a cursor coordinate data group 71. In FIG. 16, the same reference numerals as those shown in FIG. 12 correspondingly denote the same data as those shown in FIG. 12, and the same data are not described in detail.

The cursor coordinate data group 71 is a collection of data (cursor coordinate data) representing coordinates (cursor coordinates) of the position of the cursor on the screen. In the second embodiment, a process of calculating the cursor coordinates using the input coordinates is performed for each frame. Thus, the player can move the cursor using the touch pad 7. When the cursor coordinates are calculated, the game apparatus 2 additionally and chronologically stores the cursor coordinate data in the main memory 17. While the touch inputs are being sequentially detected, new cursor coordinates are calculated. Therefore, while the touch inputs are being sequentially detected, new cursor coordinate data is added to the cursor coordinate data group 71. The cursor coordinate data group 71 has its content reset when a touch-off is performed. Accordingly, the cursor coordinate data representing the cursor coordinates which are firstly calculated after a touch-on is performed is stored as first cursor coordinate data 71a in the main memory 17, and the cursor coordinate data representing the cursor coordinates which are secondly calculated after the touch-on is performed is stored as second cursor coordinate data 71b in the main memory 17. Here, the cursor coordinate data representing the cursor coordinates which are obtained through the n-th calculation after the touch-on is performed is referred to as "n-th cursor coordinate data" (n is an integer greater than or equal to one).

Figure 17:
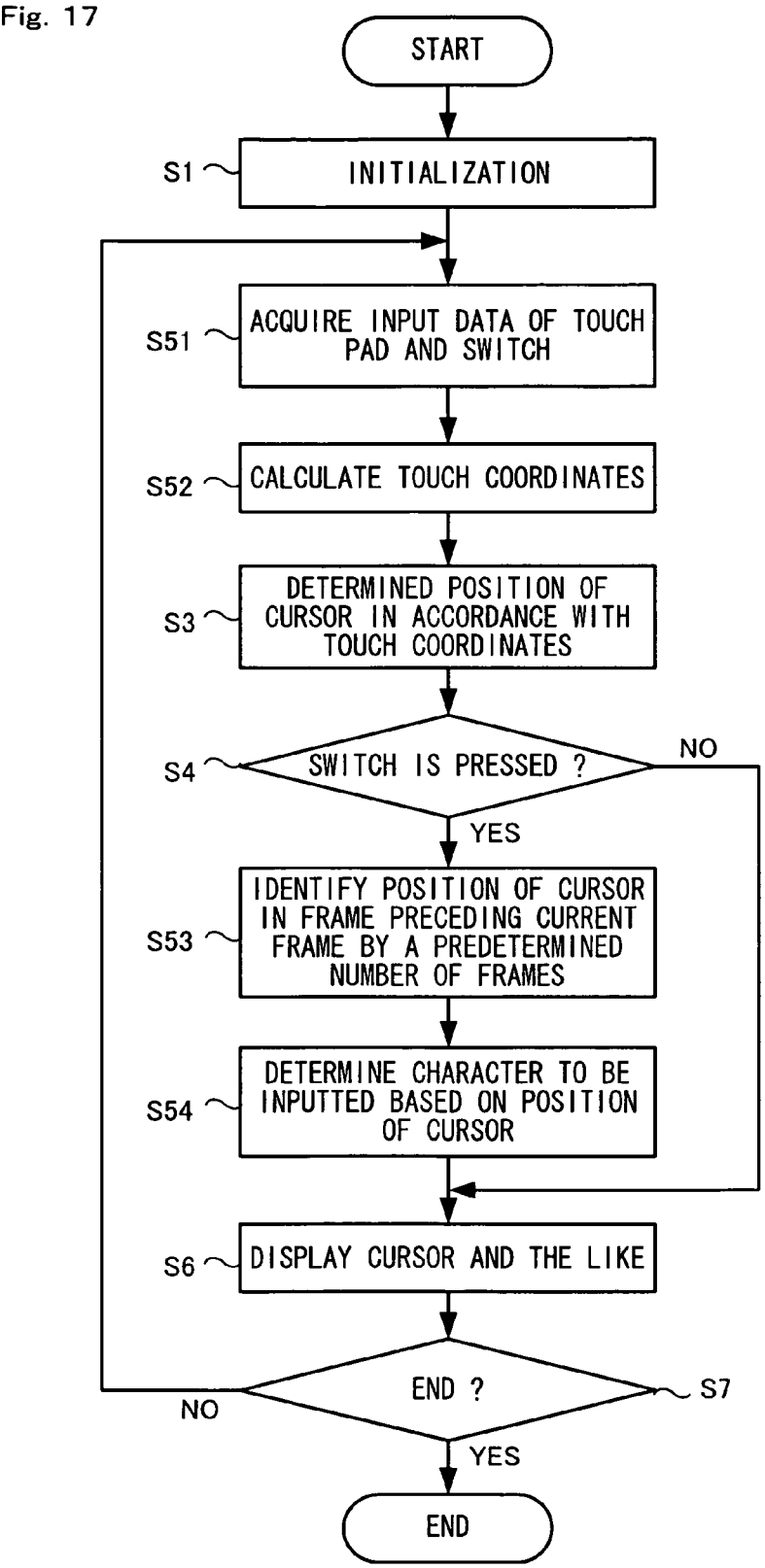
FIG. 17 is a flow chart illustrating a flow of the game process performed by the game apparatus 2 according to the second embodiment.
Figure 18:
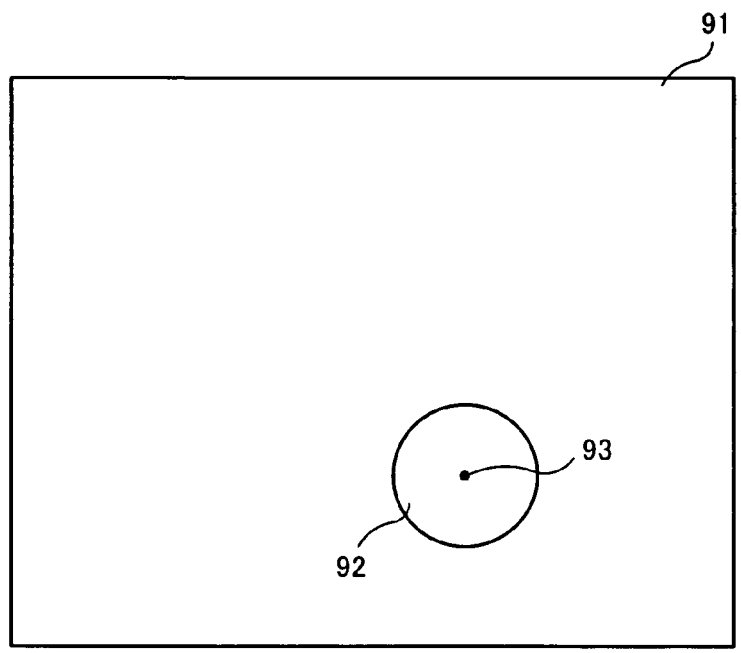
FIG. 18 is a diagram illustrating a state of an input to an input surface being made according to a conventional art.
Figure 19:
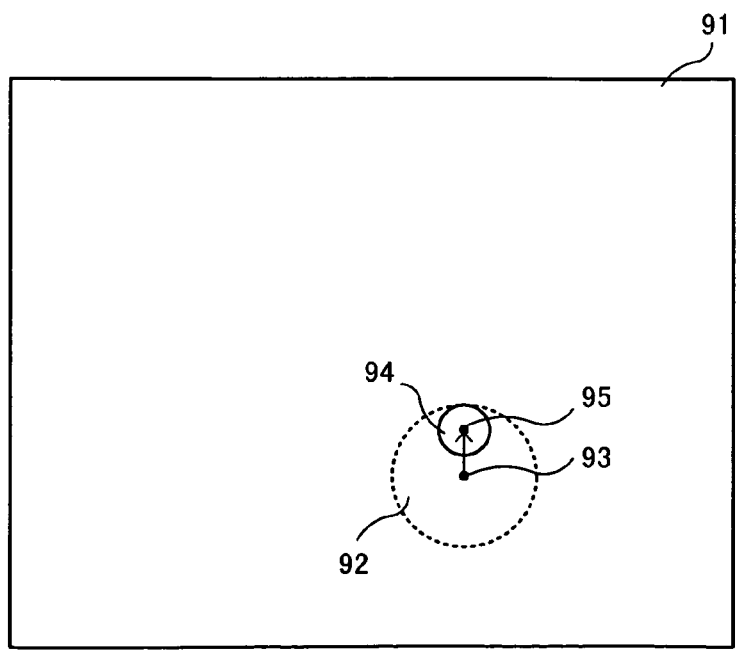
FIG. 19 is a diagram illustrating a state of the input to the input surface being made according to the conventional art.

Next, the game process according to the second embodiment will be described in detail with reference to FIG. 17. FIG. 17 is a flow chart illustrating a flow of the game process performed by the game apparatus 2 according to the second embodiment. An operation performed from the power-on of the game apparatus 2 to the start of the game process shown in FIG. 17 is the same as that described for the first embodiment. In FIG. 17, the same step Nos. as shown in FIG. 13 correspondingly represent the same process steps as shown in FIG. 13, and the same steps are not described in detail.

In FIG. 17, in step S1, the initialization is performed. The initialization is the same as the initialization described for the first embodiment. After the initialization is performed in step S1, the game is started and the process loop of steps S51 to S7 is repeated for each frame, thereby playing the game.

In step S51, the input data, relating to the touch pad 7 and the switch, are acquired. In the second embodiment, the input data relating to the touch pad 7 contains data representing the input coordinates, and may not contain data representing the input area size. Further, the input data relating to the switch indicates whether or not the switch has been pressed. The CPU 11 reads from the controller 5 the input data relating to the touch pad 7 and the switch, and stores the read data in the main memory 17. The data representing the input coordinates is stored as the input coordinate data 51 in the main memory 17. Following step S51, the process advances to step S52.

In step S52, the touch coordinates are calculated based on the input coordinate data having been acquired in step S51. The touch coordinates may be calculated in any method. For example, the touch coordinates may be calculated in the same method used in the touch coordinate calculation process (step S3) of the first embodiment or the input coordinates represented by the input coordinate data may be used as the touch coordinates as they are. Following step S52, the process advances to step S3.

In step S3, the position of the cursor on the screen is calculated using the touch coordinates having been calculated in step S52. The process of step S3 is the same as step 3 described for the first embodiment. The data (cursor coordinate data) representing the cursor coordinates of position of the cursor calculated in step S3 is additionally stored in the main memory 17.

The determination process of step S4 following step S3 is the same as step 4 described for the first embodiment. In the second embodiment, when it is determined in step S4 that the switch has been pressed, steps S53 and S54 are performed. On the other hand, when it is determined in step S4 that the switch has not been pressed, steps S53 and S54 are skipped and the process advances to step S6.

In step S53, identified is a position of a cursor having been obtained in a frame which precedes a current frame by a predetermined number of frames. Specifically, the CPU 11 identifies, based on the cursor coordinate data group 71 stored in the main memory 17, the cursor coordinate data having been calculated in a frame which precedes a current frame by a predetermined number of frames. Thus, identified is the position of the cursor coordinates represented by the cursor coordinate data having been identified. For example, the i-th cursor coordinate data (i is an integer greater than or equal to one) is stored in the main memory 17 as the most recent cursor coordinate data. When the predetermined number is represented as j (j is an integer greater than or equal to one), the CPU 11 identifies the cursor coordinates represented by the (i-j)th cursor coordinate data. As described above, it is possible to identify the position of the cursor having been obtained in the frame which precedes the current frame by the predetermined number of frames.

In the above example, when j≥i is satisfied, no cursor coordinate data can be identified. In order to prevent this state, for example, when j≥i is satisfied, the cursor position of the cursor coordinates represented by the first cursor coordinate data may be used as the cursor position to be identified in step S53. Alternatively, for example, the predetermined number may be set so as not to actually satisfy j≥i. That is, the predetermined number j may be set such that a time period obtained by multiplying the predetermined number j by a frame time is shorter than a minimum time period required for the player to press the switch after touching the touch pad 7 with a finger.

Following step S53, in step S54, the key to be designated by the cursor is determined. Specifically, the CPU 11 determines, as the key to be designated, a key to have been designated by the cursor which was positioned at the cursor position identified in step S53. The key to be determined is not a key designated by the current cursor but the key to have been designated by the cursor having been obtained in the frame which precedes the current frame by the predetermined number of frames. Thus, it is possible to determine, as the key to be designated by the cursor, the key intended by the player so as to prevent a movement of the cursor against the player's intention when the switch is pressed.

Steps S6 and S7 are the same as steps S6 and S7 described for the first embodiment, and the detailed description is not given.

As described above, according to the second embodiment, as a key used for inputting a character, selected is the key which is designated by the cursor which was obtained at time (specifically, time which precedes the current time by a time period corresponding to the predetermined number of frames) slightly before the switch is pressed, instead of the cursor obtained at time when the switch is pressed. When the player moves the cursor using the touch pad 7 so as to select a key, the player initially moves the cursor such that the cursor designates a desired key, and thereafter the player presses the switch. That is, immediately before the switch is pressed, the cursor may accurately designate a desired key. Therefore, according to the present embodiment, even when the switch being pressed causes a movement of the cursor unintended by the player, the key to have been designated by the cursor having been obtained before the switch is pressed can be selected, thereby ensuring that the player can accurately select the desired key.

In the second embodiment, the cursor coordinate data are stored, and when it is determined that the switch has been pressed, the cursor position intended by the player is identified using the cursor coordinate data having been obtained at time which precedes the current time by the time period corresponding to the predetermined number of frames. In another embodiment, the input coordinates or the touch coordinates may be stored instead of the cursor coordinate data. In this case, when it is determined that the switch has been pressed, the game apparatus may identify the cursor position intended by the player using the input coordinates or the touch coordinates obtained at time which precedes the current time by the time period corresponding to the predetermined number of frames.

Further, in the second embodiment, the predetermined number used in step S53 is pre-set. In another embodiment, the predetermined number may be determined based on a state of the input to the touch pad being made, and the like. For example, when the touch pad can detect for the input area size, the game apparatus stores, for each frame, data representing the input area size. Further, it is determined whether or not a difference between the input area size detected in the current frame and the input area size having been detected in the frame immediately preceding the current frame has a value greater than a predetermined value. When it is determined, in a certain frame (or a frame immediately preceding the certain frame), that the difference in input area size between the certain frame and the frame immediately preceding the certain frame has a value greater than the predetermined value, the cursor coordinates (the input coordinates or the touch coordinates may be also used) calculated in the certain frame (or in the frame immediately preceding the certain frame) are stored. When it is determined that the switch has been pressed, the cursor coordinates calculated in the certain frame (or in the frame immediately preceding the certain frame) is used to identify the cursor position intended by the player. Thus, it is possible to detect for the frame in which the input area size is substantially changed, that is, the frame in which the player intends to press the switch, thereby identifying the cursor position in this frame. Therefore, the cursor position can be accurately identified as intended by the player.

In the second embodiment, used is the input device allowing the touch pad to cooperate with the switches to be pressed as described above. However, the present example embodiment is applicable to an input device, including an operation section capable of inputting a two-dimensional value, which can detect that the operation section has been pressed. For example, the present example embodiment is applicable to an input device allowing a stick key to cooperate with a switch to be pressed.

Conventionally, known is a personal computer having a stick key, which can be pressed, capable of inputting a two-dimensional value. A user tilts the stick key forward, backward, rightward and leftward so as to input a two-dimensional value based on the tilting direction. Further, ON/OFF inputs can be made by pressing the stick key. Such a stick key can be used to perform, for example, a character input operation as shown in FIG. 3. That is, the two-dimensional value based on the direction in which the stick key is tilted can be used so as to move a cursor on a screen, and the stick key can be pressed so as to input a character corresponding to a key designated by a cursor.

Also when the stick key is operated as described above, the stick key is slightly tilted when the stick key is pressed. At this time, the two-dimensional value may be inputted against the player's intention. Specifically, after the player tilts the stick key so as to move the cursor to a position at which a desired key is designated, the player selects the desired key by pressing the stick key. However, when the stick key is pressed, the stick key may be slightly tilted, thereby moving the cursor.

Therefore, when it is determined that the stick key has been pressed, the cursor may designate a key different from the desired key.

Here, the information processing apparatus using the aforementioned stick key as the input device executes the program according to the second embodiment, thereby enabling the player to select a key designated by the cursor obtained before pressing the stick key. Therefore, according to the second embodiment, the information processing apparatus using the aforementioned stick key as the input device can accurately select the desired key.

Further, in the first and the second embodiments, the game apparatus 2 having received the input data, such as input coordinate data and data representing the input area size, outputted by the controller 5 performs the process of calculating the touch coordinate vector which is used for moving the cursor. In another embodiment, the controller 5 may perform the process of calculating the touch coordinate vector. That is, the controller 5 may store data representing the input area, calculate the virtual area based on the input area, and generate data (data representing at least one of the position, size, or shape of the virtual area) representing the virtual area having been calculated. The controller 5 transmits the generated data as the operation data to the game apparatus 2. The game apparatus 2 performs a predetermined game process, such as a process of moving the cursor, in accordance with the operation data having been received. According to the aforementioned features, the game apparatus 2 merely performs the game process in accordance with the operation data, and therefore a conventional game apparatus can be used as it is. That is, the aforementioned controller is connected to the conventional game apparatus, thereby realizing the game system as described with reference to FIG. 1.

According to the present example embodiment, the information processing apparatus such as the game apparatus can be provided so as to, for example, improve the controllability of the pointing device with a simplified structure.

While the example embodiments have been described in detail, the foregoing description is in all aspects illustrative and not restrictive. It is understood that numerous other modifications and variations can be devised without departing from the scope of the invention.

What is claimed is:

1. A computer-readable storage medium having stored thereon an input data processing program which causes a computer, of an information processing apparatus including an input device for detecting for a touch area on which touch is being made, to execute:
   repeatedly acquiring touch area data representing the touch area in accordance with a detection result from the input device, and storing the touch area data in a memory of the information processing apparatus;
   determining a virtual area so as to follow a change of the touch area represented by the touch area data each time the touch area data is stored in the memory; and
   executing a first process in accordance with the virtual area having been determined by the virtual area determining;
   wherein the virtual area determining determines a position of the virtual area such that a smaller one of the touch area and the virtual area is within a larger one of said areas.

2. The storage medium according to claim 1, wherein execution of the first process includes calculating, as a position of the virtual area, one of a center position of the virtual area and a centroid of the virtual area, and executing the first process in accordance with the position of the virtual area.

3. The storage medium according to claim 1, wherein the virtual area determining includes:
   determining a size of the virtual area so as to follow a size of the touch area each time the touch area data is stored in the memory; and
   moving, when at least a portion of the smaller one of the virtual area having the size determined by the size determining and the touch area is outside the larger one, the position of the virtual area such that the smaller one is entirely within the larger one.

4. The storage medium according to claim 3, wherein the size determining determines the size of the virtual area using a difference between the size of the virtual area having been most recently determined and the size of the touch area.

5. The storage medium according to claim 4, wherein
   each of the touch area and the virtual area is represented as a circular area, and
   the size determining determines a radius of the virtual area using a difference between the radius of the virtual area having been most recently determined and a radius of the touch area.

6. The storage medium according to claim 3, wherein the moving includes determining, when the smaller one of the virtual area and the touch area has an external area which is outside the larger one, a moving distance over which the virtual area is moved, in accordance with a size of the external area.

7. The storage medium according to claim 6, wherein
   each of the touch area and the virtual area is represented as a circular area, and
   the moving includes determining the moving distance over which the virtual area is moved, by using a radius of the touch area, a radius of the virtual area, and a distance between a center position of the virtual area having been most recently calculated and a center position of the touch area.

8. The storage medium according to claim 1, wherein
   the virtual area is represented as a circular area,
   the virtual area determining includes storing, in the memory, virtual position data representing a position of the virtual area and virtual radius data representing a radius of the virtual area; and
   the execution of the first process includes determining, using at least one of the virtual position data and the virtual radius data stored in the memory, a content of the first process to be executed.

9. The storage medium according to claim 1, wherein
   the input device outputs data representing an area size of the touch area and a position of the touch area, and
   the storing includes:
   acquiring the data outputted by the input device, and
   calculating a circular area having, at a center thereof, the position represented by the data having been acquired and having the area size represented by the data having been acquired, and storing, as the touch area data, data representing the circular area having been calculated.

10. The storage medium according to claim 1, wherein the storing includes stopping, when the detection result from the input device indicates that no touch is made, storing the touch area data in the memory.

11. The storage medium according to claim 1, wherein
   the information processing apparatus includes a display device, and
   the execution of the first process includes executing, as the first process, a process of moving, using a position of the virtual area, a position of an object displayed on a screen of the display device.

12. The storage medium according to claim 1, wherein
the input device includes a pressing-operation detection device, supporting the input surface so as to allow the input surface to be pressed, for detecting that the input surface has been pressed, and
the input data processing program causes the computer to further execute, when the input surface having been pressed is detected, a second process.

13. The storage medium according to claim 12, wherein
the information processing apparatus includes a display device,
the execution of the first process includes executing, as the first process, a process of moving a position of a cursor displayed on a screen of the display device, in accordance with a position of the virtual area, and
the execution of the second process includes executing the second process using, as a subject to be processed, an object designated by the cursor from among objects displayed on the screen.

14. A computer-readable storage medium having stored thereon an input data processing program which causes a computer, of an information processing apparatus including an input device for detecting for an input area on which an input to an input surface is being made, to execute:
repeatedly acquiring input area data representing the input area in accordance with a detection result from the input device, and storing the input area data in a memory of the information processing apparatus;
determining a virtual area to be changed so as to follow a change of the input area represented by the input area data and by an amount smaller than a change amount of the input area, each time the input area data is stored in the memory; and
executing a first process in accordance with the virtual area having been determined by the virtual area determining;
wherein the virtual area determining determines a position of the virtual area such that a smaller one of the input area and the virtual area is within a larger one of said areas.

15. An information processing apparatus including an input device for detecting for a touch area on which touch is being made, comprising:
a storage controller for repeatedly acquiring touch area data representing the touch area in accordance with a detection result from the input device, and storing the touch area data in a memory of the information processing apparatus;
virtual area determination programmed logic circuitry for determining a virtual area so as to follow a change of the touch area represented by the touch area data each time the touch area data is stored in the memory; and
first process execution programmed logic circuitry for executing a first process in accordance with the virtual area having been determined by the virtual area determination programmed logic circuitry; wherein
the virtual area is represented as a circular area,
the virtual area determination programmed logic circuitry stores, in the memory, virtual position data representing a position of the virtual area and virtual radius data representing a radius of the virtual area;
the first process execution programmed logic circuitry determines, using at least one of the virtual position data and the virtual radius data stored in the memory, a content of the first process to be executed; and
the virtual area determination programmed logic circuitry determines a position of the virtual area such that a smaller one of the touch area and the virtual area is within a larger one of said areas.

16. A computer readable storage medium having stored thereon an input data processing program which causes a computer, of an information processing apparatus including a display device, a first input device for detecting for an operation state of a player operating an operation section, and outputting a two-dimensional value representing the operation state, and a second input device for detecting that the operation section has been pressed, to execute:
a display control step of displaying, on a screen of the display device, a plurality of objects and a cursor for designating one of the plurality of objects;
a storage step of repeatedly acquiring, from the first input device, first data representing the two-dimensional value, and storing the first data in a memory of the information processing apparatus;
an acquisition step of acquiring, from the second input device, second data indicating that the operation section has been pressed;
a position control step of determining a position of the cursor using the two-dimensional value represented by the first data each time the first data is stored in the memory;
a previous position identification step of identifying, when the second data has been acquired, the position of the cursor using the first data which precedes, by a predetermined number of pieces of the first data, the first data which is stored in the memory immediately after the second data has been acquired, and
a process execution step of subjecting, to a process corresponding to an operation of the operation section being pressed, the object to have been designated by the cursor which was at the position identified by the previous position identification step, when the second data has been acquired.

17. The storage medium according to claim 16, wherein the predetermined number used by the previous position identification step is pre-set.

18. The storage medium according to claim 16, wherein
the first input device is capable of detecting for an area size of an input area on which an input to an input surface is being made;
the first data represents the area size of the input area and the two-dimensional value;
the previous position identification step identifies, when a difference between the area size of the input area represented by the first data stored at a certain time and the area size of the input area represented by the first data immediately following the first data stored at the certain time has a value greater than a predetermined value, the position of the cursor by using one of the two-dimensional value represented by the first data stored at the certain time and the two-dimensional value represented by the first data immediately following the first data stored at the certain time.

\* \* \* \* \*